(12) United States Patent
Yao et al.

(10) Patent No.: US 10,465,509 B2
(45) Date of Patent: Nov. 5, 2019

(54) COLLOCATED MULTITONE ACOUSTIC BEAM AND ELECTROMAGNETIC FLUX LEAKAGE EVALUATION DOWNHOLE

(71) Applicant: BAKER HUGHES INCORPORATED, Houston, TX (US)

(72) Inventors: Xiaochu Yao, Houston, TX (US); Otto N. Fanini, Houston, TX (US); Wei Han, Sugar Land, TX (US); Mohamed Daoud, Houston, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 377 days.

(21) Appl. No.: 15/291,797

(22) Filed: Oct. 12, 2016

(65) Prior Publication Data

US 2018/0100950 A1    Apr. 12, 2018

(51) Int. Cl.
*E21B 49/00* (2006.01)
*G01V 1/50* (2006.01)

(52) U.S. Cl.
CPC .............. *E21B 49/003* (2013.01); *G01V 1/50* (2013.01)

(58) Field of Classification Search
CPC ........................... E21B 49/003; G01V 11/002
See application file for complete search history.

(56) References Cited

U.S. PATENT DOCUMENTS

| | | |
|---|---|---|
| 3,973,441 A | 8/1976 | Porter |
| 4,096,437 A | 6/1978 | Kitzinger et al. |
| 4,468,619 A | 8/1984 | Reeves |
| 4,659,991 A | 4/1987 | Weischedel |
| 4,789,827 A | 12/1988 | Bergander |
| 4,843,317 A | 6/1989 | Dew |
| 4,945,306 A | 7/1990 | Lowther |
| 5,293,117 A | 3/1994 | Hwang |
| 5,397,985 A | 3/1995 | Kennedy |

(Continued)

FOREIGN PATENT DOCUMENTS

| | | |
|---|---|---|
| WO | 2016007305 A1 | 1/2016 |
| WO | 2016007883 A1 | 1/2016 |

OTHER PUBLICATIONS

Sharar, M.A., et al., "High Resolution Casing Imaging Utilizing Magnetic Flux Leakage Measurements," SPE114133, 8 pp. (2008).

(Continued)

*Primary Examiner* — Caroline N Butcher
(74) *Attorney, Agent, or Firm* — Mossman, Kumar & Tyler PC

(57) ABSTRACT

Methods, systems, devices, and products for well logging using a logging tool in a borehole in an earth formation. Methods include conveying the logging tool in the borehole on a carrier; taking acoustic well logging measurements with the logging tool including generating a multitone acoustic beam from at least one transmitter on the tool, the beam comprising a high frequency signal modulated by a low frequency envelope, the high frequency signal including a first subsignal at a first frequency and a second subsignal at a second frequency, and generating measurement information at at least one acoustic receiver on the logging tool in response to a plurality of acoustic reflections of the acoustic beam from at least one volume of interest in the formation; and estimating a property of the volume of interest using the measurement information.

22 Claims, 15 Drawing Sheets

(56) References Cited

U.S. PATENT DOCUMENTS

| | | | |
|---|---|---|---|
| 5,461,313 A | 10/1995 | Bohon et al. | |
| 5,532,587 A | 7/1996 | Downs et al. | |
| 5,537,035 A | 7/1996 | Fowler et al. | |
| 5,670,878 A | 9/1997 | Katahara et al. | |
| 5,864,232 A | 1/1999 | Laursen | |
| 6,833,706 B2 | 12/2004 | Niina | |
| 6,924,640 B2 | 8/2005 | Fickert et al. | |
| 6,974,415 B2 | 12/2005 | Cerwin et al. | |
| 7,150,317 B2 | 12/2006 | Barolak et al. | |
| 7,403,000 B2 | 7/2008 | Barolak et al. | |
| 7,755,973 B2 | 7/2010 | Tello | |
| 7,960,969 B2 | 6/2011 | Mouget et al. | |
| 8,061,206 B2 | 11/2011 | Bolshakov et al. | |
| 9,175,559 B2 | 11/2015 | Dowla et al. | |
| 2003/0117134 A1 | 6/2003 | Almaguer | |
| 2004/0100256 A1 | 5/2004 | Fickert et al. | |
| 2006/0202685 A1 | 9/2006 | Barolak et al. | |
| 2006/0202686 A1 | 9/2006 | Barolak et al. | |
| 2010/0263449 A1* | 10/2010 | Bolshakov | G01B 17/02 |
| | | | 73/597 |
| 2013/0255940 A1 | 10/2013 | Rochford et al. | |
| 2014/0301164 A1* | 10/2014 | Mandal | E21B 49/00 |
| | | | 367/35 |
| 2015/0122030 A1 | 5/2015 | Amir et al. | |
| 2015/0204993 A1* | 7/2015 | Leggett, III | E21B 47/01 |
| | | | 367/7 |
| 2015/0219780 A1* | 8/2015 | Zeroug | E21B 47/0005 |
| | | | 702/6 |
| 2016/0017705 A1 | 1/2016 | Krivosheev et al. | |
| 2016/0077236 A1 | 3/2016 | Bonavides et al. | |
| 2016/0245779 A1* | 8/2016 | Khalaj Amineh | E21B 47/00 |

OTHER PUBLICATIONS

Brill, T. M., et al., "Quantitative Corrosion Assessment with an EM Casing Inspection Tool," SPE149069, 16 pp. (2011).

Tello, Lucio N., et al., "High Resolution Real-Time Thickness Measurement of Internal and External Casing Anomalies with Ultrasonic Scanner Tools," SPE-149631-MS, 8 pp. (2014).

Tello, Lucio N., et al., "Ultrasonic High Resolution Real Time Thickness Combined With High Resolution Multi-Sensor Caliper and CBL Tools in a Single Pass: New Mechanical Well Integrity Logging String Identifies Difficult Casing Problems," SPE-172807-MS, 11 pp. (2015).

* cited by examiner

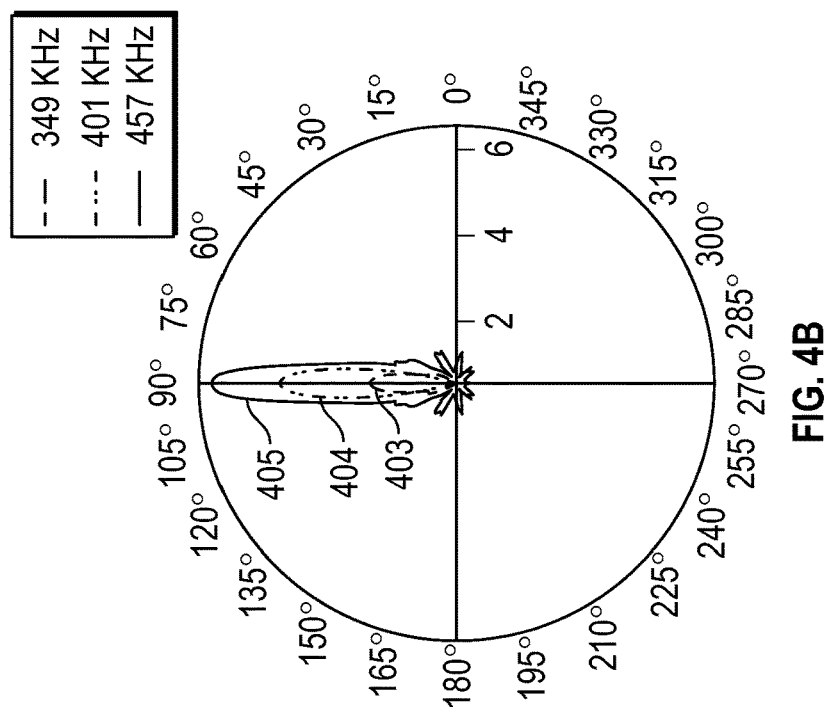
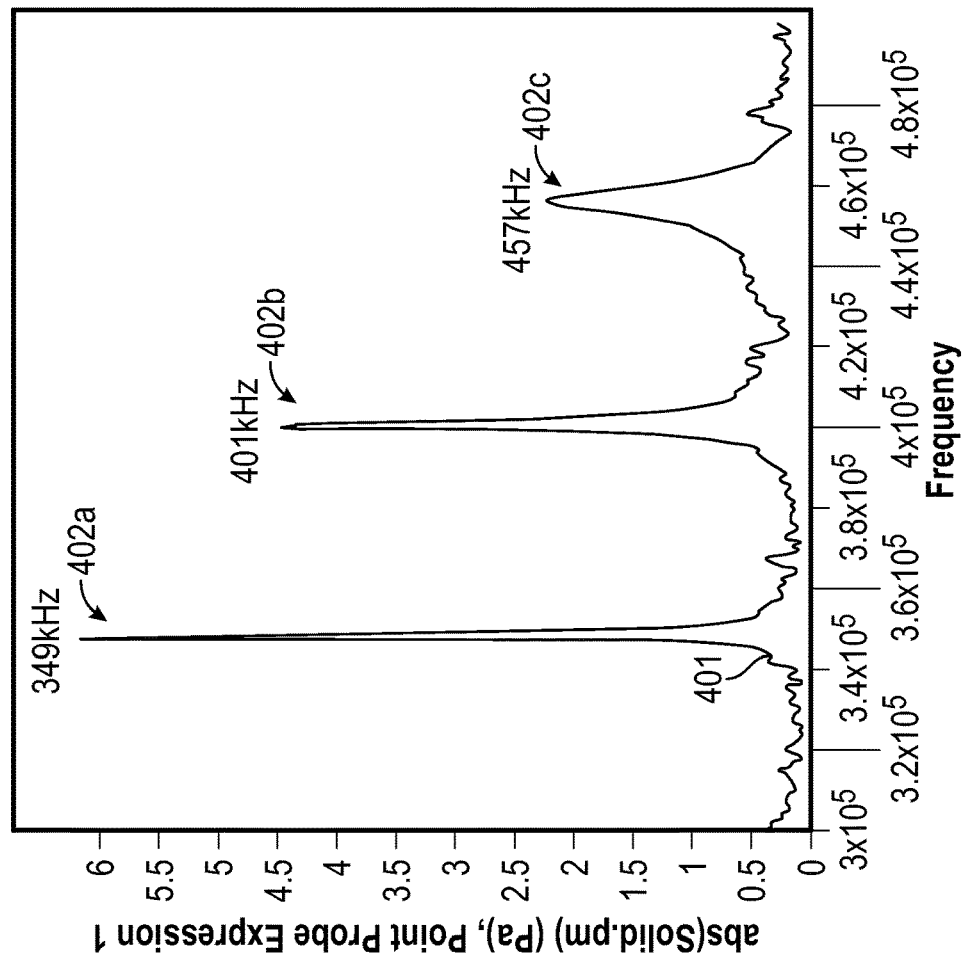
FIG. 4A
FIG. 4B $$DIP = ARC\ TAN\left(\frac{H}{BHD}\right)$$

COLLOCATED MULTITONE ACOUSTIC BEAM AND ELECTROMAGNETIC FLUX LEAKAGE EVALUATION DOWNHOLE

FIELD OF THE DISCLOSURE

This disclosure generally relates to borehole tools, and in particular to methods and apparatuses for conducting well logging.

BACKGROUND OF THE DISCLOSURE

Drilling wells for various purposes is well-known. Such wells may be drilled for geothermal purposes, to produce hydrocarbons (e.g., oil and gas), to produce water, and so on. Well depth may range from a few thousand feet to 25,000 feet or more. In hydrocarbon wells, downhole tools often incorporate various sensors, instruments and control devices in order to carry out any number of downhole operations. Thus, the tools may include sensors and/or electronics for formation evaluation, monitoring and controlling the tool itself, and so on.

Systems having an acoustic logging instrument as part of an after-drilling wireline logging system for measuring acoustic velocities of subsurface formations and determining the location of formation bed boundaries around the wireline logging system are known. Tools for imaging of acoustically reflective boundaries using directional acoustic sources, and tools for acoustically inspecting casing integrity are also known.

SUMMARY OF THE DISCLOSURE

In aspects, the present disclosure is related to methods and apparatuses for of well logging using a logging tool in a borehole in an earth formation, and may include estimating at least one downhole parameter relating to an earth formation intersected by a borehole, such as, for example, positions and dimensions of borehole tubulars. Methods may include conveying the logging tool in the borehole on a carrier; taking acoustic well logging measurements with the logging tool including generating a multitone acoustic beam from at least one transmitter on the tool, the beam comprising a high frequency signal modulated by a low frequency envelope, the high frequency signal including a first subsignal at a first frequency and a second subsignal at a second frequency, and generating measurement information at at least one acoustic receiver on the logging tool in response to a plurality of acoustic reflections of the acoustic beam from at least one volume of interest in the formation; and estimating a property of the volume of interest using the measurement information. At least one of the first frequency and the second frequency may correspond to a resonant frequency of the at least one tubular.

The volume of interest may comprise a plurality of nested conductive tubulars in the borehole, and estimating the property comprises estimating a property corresponding to at least one tubular of the plurality of nested conductive tubulars. Estimating the property may comprise estimating a property corresponding to each conductive tubular of the plurality of nested conductive tubulars. The property corresponding to each conductive tubular may comprise at least one of: i) location of the tubular; ii) thickness of the tubular; and iii) at least one property of a defect of the tubular; iv) a presence of a completion component outside at least one tubular; and v) a property of a completion component outside at least one tubular.

Methods may include generating an electromagnetic (EM) field using an EM transmitter of the logging tool to produce interactions between the electromagnetic field and the plurality of nested conductive tubulars; obtaining EM measurements indicative of the interactions; and performing an inversion of the EM measurements using a forward model generated with the property corresponding to each conductive tubular. The interactions may include at least one of: i) magnetic flux leakage; and ii) induced eddy currents. Generating the electromagnetic (EM) field may comprise exciting an EM field using a first radially oriented EM transmitter at a first polarity and a second radially oriented EM transmitter at a second polarity opposite of the first polarity.

Methods may include performing a joint inversion using the EM measurements and the measurement information at the at least one acoustic receiver to resolve a structural feature relating to at least one tubular of the plurality of nested conductive tubular, the structural feature comprising at least one of: i) tubular ovality of the at least one tubular; ii) deformation of the at least one tubular; iii) corrosion of the at least one tubular, iv) perforation of the at least one tubular, v) a presence of a completion component outside of the at least one tubular, vi) eccentricity of the at least one tubular with respect to another component, vii) a material property of the at least one tubular; viii)a material property of a material surrounding the at least one tubular.

Methods may include generating the multitone acoustic beam using a rotating stacked transducer. The beam may be generated by supplying a multitone modulated signal to a transducer, the multitone modulated signal derived by applying an envelope modulating frequency signal to a center frequency signal. The beam may be generated by generating low-frequency acoustic beat signals from interference of at least two high-frequency acoustic beams.

The carrier may include at least one of i) a drill string; and ii) a wireline. Where the carrier comprises a drill string, the logging tool may include a bottom hole assembly (BHA), and the at least one transmitter may include a transmitter disposed on the drill bit. Methods may include performing drilling operations by rotating a drill bit disposed at a distal end of the drill string and taking acoustic well logging measurements during drilling operations.

Further operations may comprise at least one of: i) geosteering; ii) drilling additional boreholes in the formation; iii) performing additional measurements on the formation; iv) estimating additional parameters of the formation; v) installing equipment in the borehole; vi) evaluating the formation; vii) optimizing present or future development in the formation or in a similar formation; viii) optimizing present or future exploration in the formation or in a similar formation; ix) drilling the borehole; and x) producing one or more hydrocarbons from the formation.

The volume of interest may comprise a volume of a rock matrix of the formation. Estimating the property may comprise estimating at least one of: i) a bulk modulus of the rock matrix; ii) a shear modulus of the rock matrix; iii) a Young's modulus of the rock matrix; iv) a Poisson ratio of the rock matrix; v) a porosity of the rock matrix; vi) a compressional velocity of the formation; and vii) a shear velocity of the formation.

Methods may include conducting further operations in the formation in dependence upon the property. The high frequency signal may comprise a frequency greater than 100 kHz; and the low frequency envelope may comprise a frequency less than 100 kHz. The multitone acoustic beam may have a lateral beam field of dimensions substantially the same as that of the high-frequency signal.

Generating measurement information may comprise producing a plurality of borehole caliper measurements including measurements from each of a plurality of azimuthally distributed orientations about the carrier; estimating a property of the volume of interest using the measurement information may comprise estimating a property of the borehole. The property may comprise at least one of i) a geometry of the borehole; and ii) an image of the borehole wall.

Other general method embodiments may include conveying the logging tool in the borehole on a carrier; taking electromagnetic (EM) well logging measurements with the logging tool including generating an electromagnetic (EM) field using an EM transmitter of the logging tool to produce interactions between the electromagnetic field and a plurality of nested conductive tubulars in the borehole and obtaining EM measurements indicative of the interactions; and estimating a property corresponding to a volume of interest comprising at least one tubular of the plurality of nested conductive tubulars by performing an inversion of the EM measurements. Generating the electromagnetic (EM) field may include exciting the EM field using a first radially oriented EM transmitter at a first polarity and a second radially oriented EM transmitter at a second polarity opposite of the first polarity. The interactions may comprise at least one of: i) magnetic flux leakage; and ii) induced eddy currents.

Methods as described above implicitly utilize at least one processor. Some embodiments include a non-transitory computer-readable medium product accessible to the processor and having instructions thereon that, when executed, causes the at least one processor to perform methods described above. Apparatus embodiments may include, in addition to specialized borehole measurement equipment and conveyance apparatus, at least one processor and a computer memory accessible to the at least one processor comprising a computer-readable medium having instructions thereon that, when executed, causes the at least one processor to perform methods described above.

Examples of some features of the disclosure may be summarized rather broadly herein in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein:

FIGS. 4A & 4B illustrate signal characteristics of signals in accordance with embodiments of the present disclosure.

DETAILED DESCRIPTION

Figure 1A:
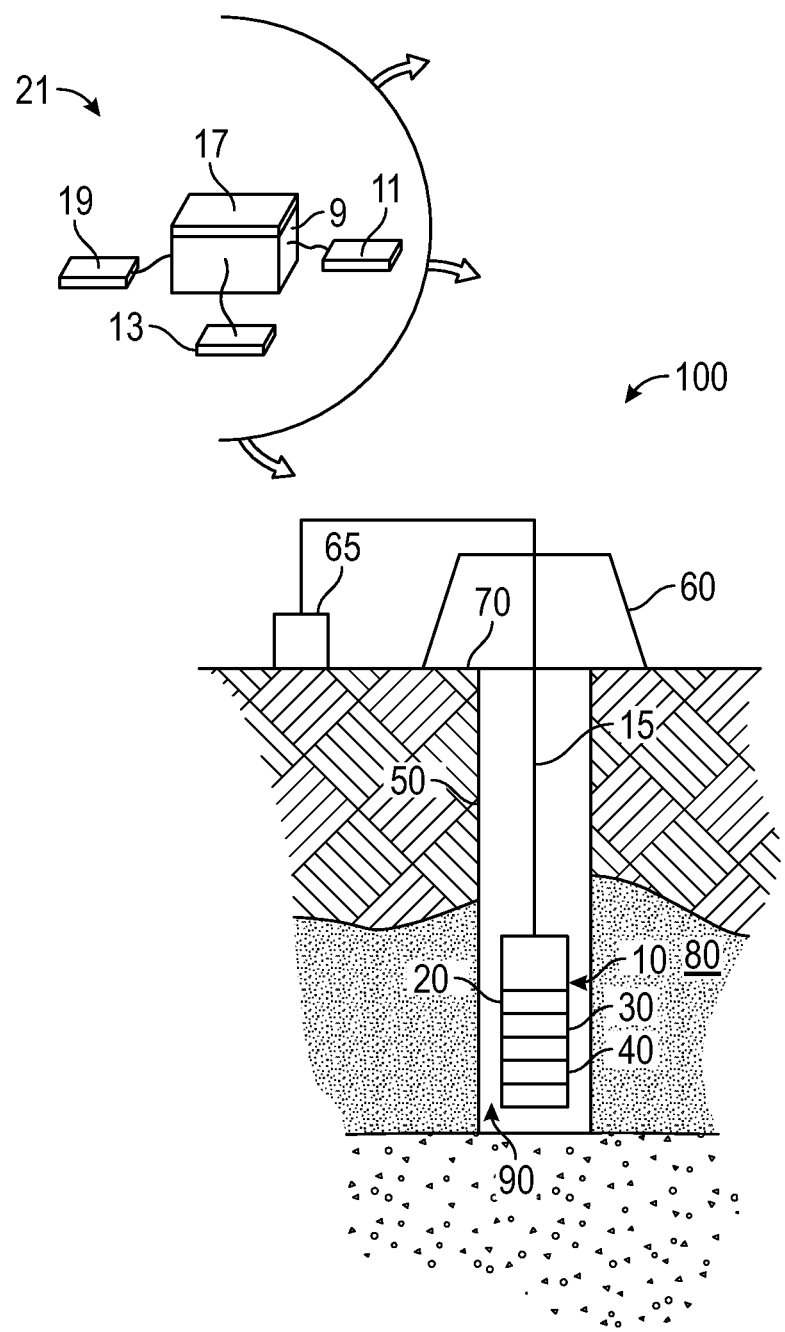
FIG. 1A schematically illustrates an acoustic wellbore logging system having a downhole tool configured to acquire acoustic measurement information.

Aspects of the present disclosure relate to apparatus and methods for acoustic well logging, including measurement and interpretation of physical phenomena indicative of parameters of interest of the formation, the borehole, infrastructure installed in the formation (e.g., casing), downhole fluids in one of these, or combinations of the same. Techniques described herein are particularly suited to casing integrity inspection using co-located high azimuthal definition dual-tone acoustic beams, and, more particularly, to analysis and formation characterization using join interpretation of dual-tone acoustic beam data and electro-magnetic flux leakage data. Further aspects include improved instruments for measurement of EM flux data.

Inspection of underground tubular is well known. Vast subterranean networks of installed tubular may suffer from defects at particular, but unpredictable, points. Detection of these defects are highly desirable. One prominent application is the detection of corrosion defects in downhole casing and tubing strings. Logging such strings is often the best (sometimes only) means of detecting these defects.

Known EM corrosion-monitoring tools typically rely the physical phenomena of flux leakage and/or electromagnetic induction. A flux leakage tool may magnetize the pipe to be inspected until substantially saturated. Near a point of defect (e.g., a pit, hole, or corroded area) on either the interior or exterior of the tubular, a portion of the magnetic flux leaks out of the tubular and is detected by coils on the tool's sensors. Since the magnet must be as close as possible to the tubular, tubing must be removed in order to inspect casing. Further, detection of slowly varying corrosion with a flux leakage tool may be problematic.

Ultrasonic acoustic tools provide better resolution due to their high directivity. Unfortunately, at ultrasonic frequencies, acoustic signals cannot penetrate below the skin of the innermost tubular, in part because of the lower resonance frequency of the acoustic system represented by the multiple liner installation, while lower frequencies suffer from insufficient directivity for detection of corrosion defects. Embodiments may also excite an acoustic wave approximating the resonances of different casing and cement layers, which enhance wave penetration.

Aspects of the present disclosure include systems, devices, products, and methods of well logging using a logging tool in a borehole in an earth formation. Methods may include conveying the logging tool in the borehole on a carrier; taking acoustic well logging measurements with the logging tool, and estimating a property of a volume of interest of the formation.

Taking acoustic well logging measurements may be carried out by generating a rotating multitone acoustic beam from at least one transmitter on the tool, the beam comprising a high frequency signal modulated by a low frequency envelope, the high frequency signal including a first subsignal at a first frequency and a second subsignal at a second frequency; and generating measurement information at at least one acoustic receiver on the logging tool in response to a plurality of acoustic reflections of the acoustic beam from at least one volume of interest in the formation. An acoustic beam may be defined as an acoustic emission of limited aperture. The property of the volume is estimated from the measurement information.

Multitone acoustic waves may introduce non-linear harmonic generations at sum and difference frequencies, which carry the information indicating well integrity with high spatial resolution. The multitone modulated signal may be derived by applying an envelope modulating frequency signal to a center frequency signal. In one example the multitone signal is a dual-tone signal. The multitone modulated signal provides acoustic excitations of sufficiently narrow focus for direction investigation and increased frequency resolution for frequency domain resonance interpretation. Methods of the present disclosure enable acoustic beam excitation with high azimuthal feature reflection resolution and with greatly improved (much lower) attenuation than traditional low-frequency acoustic measurements. The excited acoustic wave may approximate the resonance frequency of different casing and cement layers, which enhances wave penetration. This combination of features allows for multilayer casing structure determination, including multiple layer inner diameter (ID) and outer diameter (OD) estimation for casing, cement, or both, as well as estimation of azimuthal eccentricity and formation location.

The unique set of advantages provided support employment of the techniques described herein in several downhole applications, such as borehole, near borehole, and extended imaging from wireline or drilling tools, forward-of-bit acoustic imaging, side of the bit (lateral surface direction facing drilled borehole wall) acoustic imaging, boundary detection, and rock stress evaluation including computation of elastic constants of the formation. The novel beam reaches deeper into the formation and has more directivity producing a superior evaluation of the deeper undisturbed rock, and more reliable rock properties estimation and formation evaluation results in a variety of applications.

Thus, the volume of interest may include a volume of a rock matrix of the formation, and estimating the property may include estimating at least one of: i) a bulk modulus of the rock matrix; ii) a shear modulus of the rock matrix; iii) a Young's modulus of the rock matrix; iv) a Poisson ratio of the rock matrix; v) a porosity of the rock matrix; vi) a compressional velocity of the formation; and vii) a shear velocity of the formation.

Hydrocarbon recovery may be maximized by drilling the horizontal and complex wellbores along optimal locations within the hydrocarbon-producing formations. In order to achieve such wellbore profiles, it is important to determine the true location of the drill bit relative to the formation bed boundaries and boundaries between the various fluids, such as oil, gas and water. Such wellbore profiles usually limit the horizontal reach and the final wellbore length exposed to the reservoir. Optimization of the borehole location within the formation can also have a substantial impact on maximizing production rates and minimizing gas and water coning problems. Steering efficiency and geological positioning are considered in the industry among the greatest limitations of the current drilling systems for drilling horizontal and complex wellbores. Availability of relatively precise three-dimensional subsurface acoustic maps, location of the drilling assembly relative to the bed boundaries of the formation around the drilling assembly can greatly enhance the chances of drilling boreholes for maximum recovery.

Aspects of the present disclosure include systems and methods for formation evaluation, such as performing well logging in a borehole intersecting an earth formation, as well as casing integrity inspection. Drilling systems in accordance with aspects of the present disclosure may have an acoustic "logging-while-drilling" ('LWD') or "measurement-while-drilling" ('MWD') system as part of a bottom-hole assembly.

Casing inspection tools may utilize an inversion of a multi-frequency or transient 3D electromagnetic sensor array casing survey data of multiple downhole casing liners and completion installation components, as well as acoustic imaging, based on co-located high definition acoustic beam and EM flux data. Multitone acoustic waves may be particularly useful in well inspection. In particular embodiments, the multitone signal introduces nonlinear harmonic generations at sum and difference frequencies, which carry the information indicating well integrity. Further aspects include improved instruments for measurement of EM flux data and application of these instruments for detecting and inspecting liners and installation components.

Aspects of the present disclosure relate to using at least one acoustic sensor as part of one or more downhole acoustic well logging tools or distributed sensor systems to produce acoustic information responsive to an acoustic wave from the earth formation. The sensor may include at least one acoustic transmitter configured and at least one acoustic receiver disposed on a carrier in the borehole, and configured to implement techniques of the present disclosure, as described in further detail below. A receiver and transmitter may be implemented as the same transducer, different transducers, or one or more transducer arrays. The information is indicative of a parameter of interest. The term "information" as used herein includes any form of information (analog, digital, EM, printed, etc.), and may include one or more of: raw data, processed data, and signals.

Methods may include estimating a parameter of interest from the information, evaluating the formation using the parameter of interest, and/or performing further borehole or formation operations in dependence upon the location of the reflection points, the location of the boundary, the parameter of interest of the boundary, or other parameters of interest derived from these. In particular embodiments, a state of drilling operations, characteristics of the borehole or formation, or orientation of components of the downhole tool may be estimated using the parameter of interest, and then used in performing an operation as described above.

FIG. 1A schematically illustrates an acoustic wellbore logging system 100 having a downhole tool 10 configured to acquire acoustic measurement information. This measurement information may be used for producing an acoustic image of a borehole 50 in an earth formation 80 or another parameter of interest of a formation 80 using a sensor 40 comprising at least one acoustic transducer. Sensor 40 may include a plurality of transducers in an azimuthal array about the circumference of the tool, a transducer that rotates through a plurality of azimuthal orientations via the rotation of the drill string or of an independent platform attached to the carrier, a transducer capable of sending acoustic pulses to and receiving signals from a plurality of azimuthal orientations via the use of beam-forming, and so on as will occur to those of skill in the art. Additional sensors 45 may be used to take electromagnetic measurements in the borehole.

The acoustic sensor may be configured for transmission and reception of acoustic signals. The sensor may comprise an acoustic transmitter-receiver, or transceiver (e.g., transducer). The transceiver could be formed from the same material in one collocated structure with a broad band response as used for high resolution acoustic imaging applications; that is, high ultrasonic frequencies transmitted and a received low frequency generated by transmitted frequencies mixing.

Alternatively, the transceiver could be formed from a collocated structure to allow a high resolution image comprising of two elements: a first element comprising at least one ultrasonic acoustic source to carry out the multitone acoustic beam forming transmission function, and which is responsive to higher ultrasonic frequencies; and a second element comprising at least one ultrasonic receiver configured to detect the resulting multifrequency mixed lower frequency acoustic beam signal, and performing the receiving function responsive to lower frequency resulting from the higher ultrasonic frequencies mixing. The second receiving element could be a piezoelectric or optical fiber based acoustic receiver sensor.

The system 100 may include a conventional derrick 60 erected on a derrick floor 70. A conveyance device (carrier 15) which may be rigid or non-rigid, may be configured to convey the downhole tool 10 in the wellbore 50 intersecting the earth formation 80. Drilling fluid ('mud') 90 may be present in the borehole 50. The carrier 15 may be a drill string, coiled tubing, a slickline, an e-line, a wireline, etc. Downhole tool 10 may be coupled or combined with additional tools, including, e.g., some or all the information processing system (inset). Thus, depending on the configuration, the tool 10 may be used during drilling and/or after the wellbore 50 has been formed. While a land system is shown, the teachings of the present disclosure may also be utilized in offshore or subsea applications. The carrier 15 may include embedded conductors for power and/or data for providing signal and/or power communication between the surface and downhole equipment (e.g., a seven conductor cable).

A surface control system 65 receives signals from downhole sensor 40 and other sensors used in the system 100 and processes such signals according to programmed instructions provided to the surface control system 65. The surface control system 65 may display desired parameters and other information on a display/monitor that is utilized by an operator. The surface control system 65 may further communicate with a downhole control system 20 at a suitable location on downhole tool 10. The surface control system 65 may process data relating to the operations and data from the sensor 40, and may control one or more downhole operations performed by system 100.

In one embodiment, electronics 30 associated with sensors 40 may be configured to record and/or process the information obtained. Certain embodiments of the present disclosure may be implemented with a hardware environment 21 that includes an information processor 17, an information storage medium 13, an input device 11, processor memory 9, and may include peripheral information storage medium 19. The hardware environment may be in the well, at the rig, or at a remote location. Moreover, the several components of the hardware environment may be distributed among those locations. The input device 11 may be any data reader or user input device, such as data card reader, keyboard, USB port, etc. The information storage medium 13 stores information provided by the detectors. Information storage medium 13 may include any non-transitory computer-readable medium for standard computer information storage, such as a USB drive, memory stick, hard disk, removable RAM, EPROMs, EAROMs, flash memories and optical disks or other commonly used memory storage system known to one of ordinary skill in the art including Internet based storage. Information storage medium 13 stores a program that when executed causes information processor 17 to execute the disclosed method. Information storage medium 13 may also store the formation information provided by the user, or the formation information may be stored in a peripheral information storage medium 19, which may be any standard computer information storage device, such as a USB drive, memory stick, hard disk, removable RAM, or other commonly used memory storage system known to one of ordinary skill in the art including Internet based storage. Information processor 17 may be any form of computer or mathematical processing hardware, including Internet based hardware. When the program is loaded from information storage medium 13 into processor memory 9 (e.g. computer RAM), the program, when executed, causes information processor 17 to retrieve detector information from either information storage medium 13 or peripheral information storage medium 19 and process the information to estimate a parameter of interest. Information processor 17 may be located on the surface or downhole.

The term "information" as used herein includes any form of information (analog, digital, EM, printed, etc.). As used herein, a processor is any information processing device that transmits, receives, manipulates, converts, calculates, modulates, transposes, carries, stores, or otherwise utilizes information. In several non-limiting aspects of the disclosure, an information processing device includes a computer that executes programmed instructions for performing various methods. These instructions may provide for equipment operation, control, data collection and analysis and other functions in addition to the functions described in this disclosure. The processor may execute instructions stored in computer memory accessible to the processor, or may employ logic implemented as field-programmable gate arrays ('FPGAs'), application-specific integrated circuits ('ASICs'), other combinatorial or sequential logic hardware, and so on.

In one embodiment, electronics associated with the transducers may be configured to take measurements at a plurality of azimuthal orientations as the tool moves along the longitudinal axis of the borehole ('axially') using sensor 40. These measurements may be substantially continuous, which may be defined as being repeated at very small increments of depth and azimuth, such that the resulting information has sufficient scope and resolution to provide an image of borehole parameters (e.g., electrical properties of the formation at the borehole.

In other embodiments, all or a portion of the electronics may be located elsewhere (e.g., at the surface, or remotely). To perform the treatments during a single trip, the tool may use a high bandwidth transmission to transmit the information acquired by sensors 40 and 45 to the surface for analysis. For instance, a communication line for transmitting the acquired information may be an optical fiber, a metal conductor, or any other suitable signal conducting medium. It should be appreciated that the use of a "high bandwidth" communication line may allow surface personnel to monitor and control operations in "near real-time."

One point of novelty of the system illustrated in FIG. 1A is that the at least one processor may be configured to perform certain methods (discussed below) that are not in the prior art. A surface control system or downhole control system may be configured to control the tool described above and any incorporated sensors and to estimate a parameter of interest according to methods described herein.

Techniques described herein are subject to application in various different embodiments. In some general embodiments, carrier 15 is implemented as a tool string of a drilling system, and the acoustic wellbore logging may be characterized as "logging-while-drilling" (LWD) or "measurement-while-drilling" (MWD) operations.

Figure 1B:
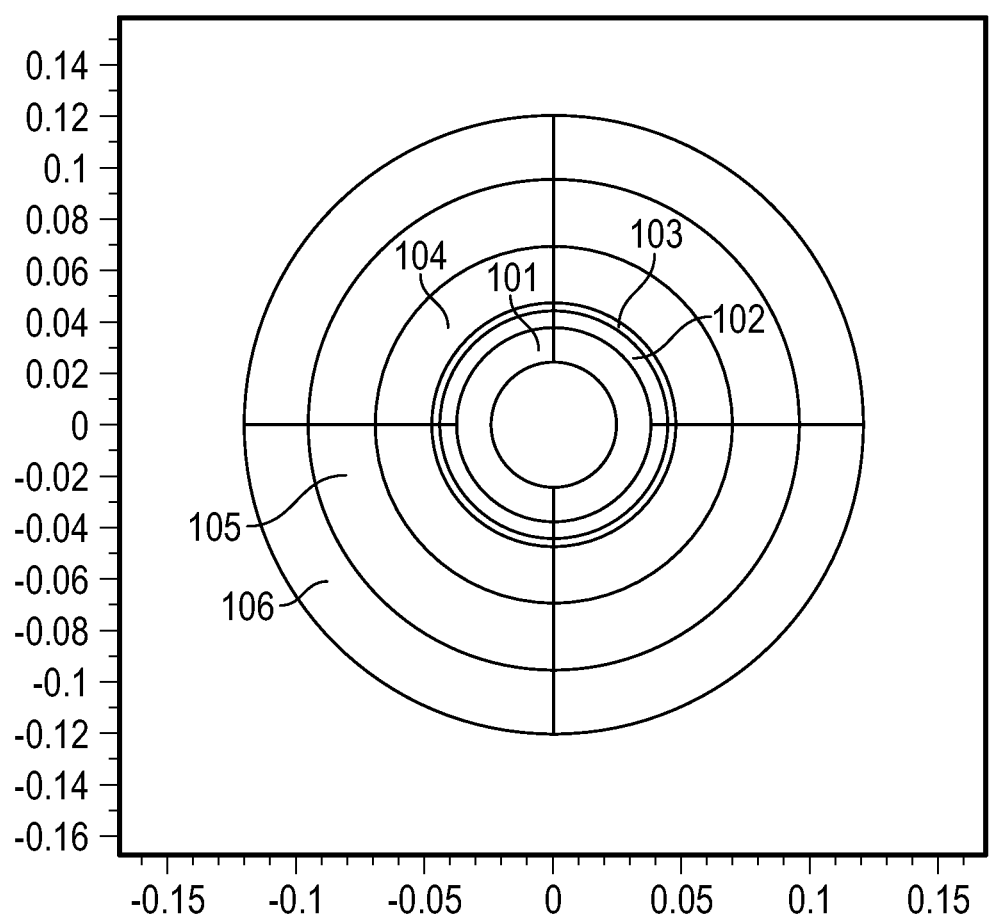
FIG. 1B is a graphical depiction a cross-section of well structures in place with respect to the borehole for operations in accordance with embodiments of the present disclosure.

FIG. 1B is a graphical depiction a cross-section of well structures in place with respect to the borehole for operations in accordance with embodiments of the present disclosure. The typical well-section includes tool 101, an annulus filled with downhole fluid 102, casing 103, and cement 104 in a borehole intersecting the formation 105 (e.g., cap-rock). For use in finite analysis, the well may also be modeled with a perfectly matched layer ('PML') 106, which is an artificial absorbing layer for wave equations, often used to truncate computational regions in numerical methods for simulation of problems with open boundaries. The tool 101 may be a central steel tubing having an outer diameter of approximately 1.9 inches. The downhole fluid 102 may be a roughly 0.25-inch to 2-inch annulus of mixtures of mud and oil and brine. Casing 103 may be, for example, a 0.25-inch thick steel casing. Cement layer 104, the modeled formation, and the Perfectly Matched Layer (TMU) may each be approximately 1 inch thick.

Figures 2A, 2B:
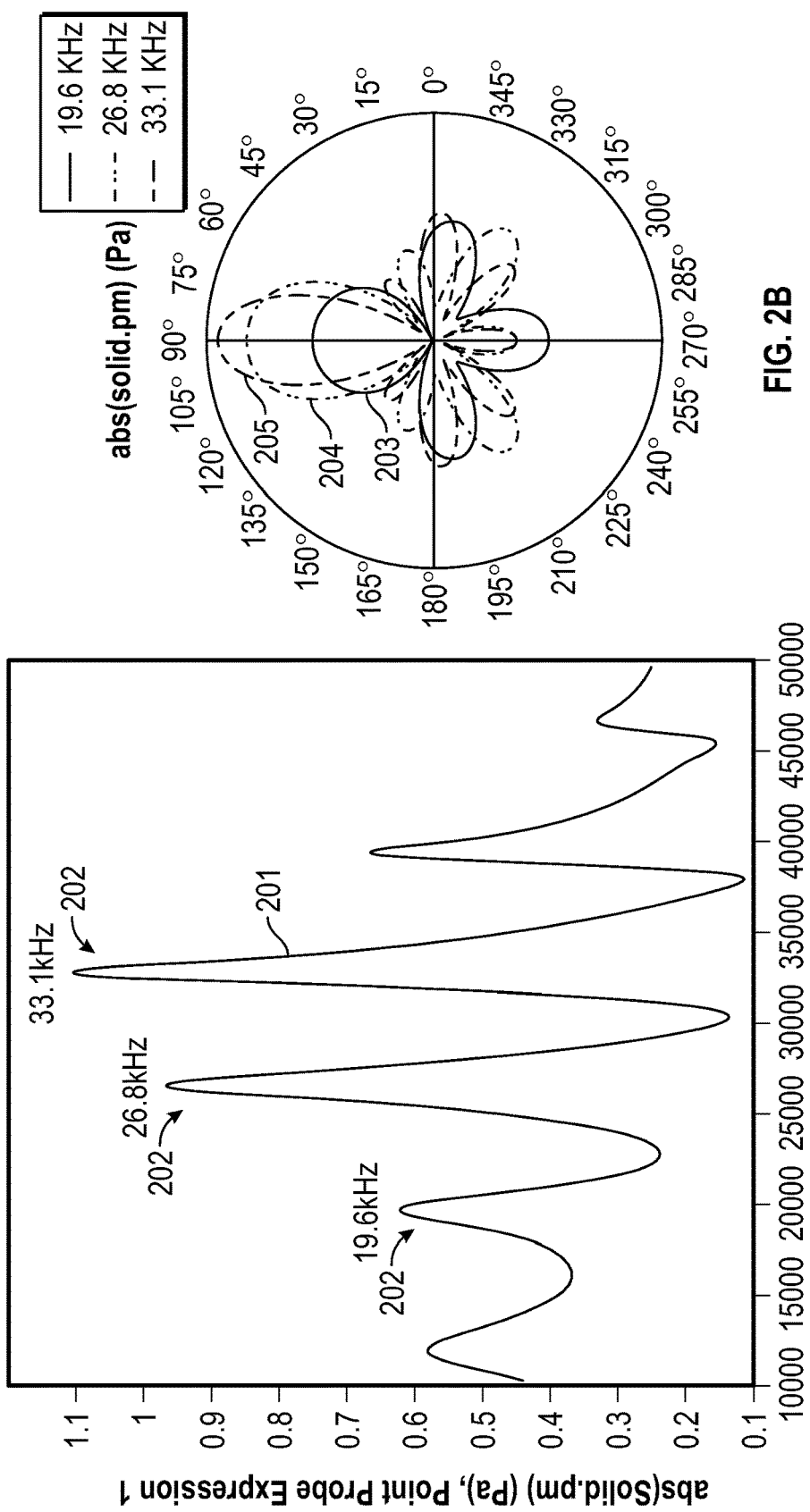
FIGS. 2A & 2B illustrate signal characteristics of low-frequency acoustic signals.

FIGS. 2A & 2B illustrate signal characteristics of low-frequency acoustic signals. FIG. 2A shows a curve 201 representing absolute pressure value with respect to frequency. Curve 201 indicates peaks 202 (local maxima) in pressure at frequencies corresponding with a resonant frequency. FIG. 2B shows a graphical indication of an azimuthal distribution of signal pressure for signals transmitted at each of the resonant frequencies, respectively. Curve 203 indicates the maximum amplitude of the pressure signal with respect to azimuth for a 19.6 kHz signal. Curve 204 indicates the maximum amplitude of the pressure signal with respect to azimuth for a 26.8 kHz signal. Curve 205 indicates the maximum amplitude of the pressure signal with respect to azimuth for a 33.1 kHz signal. It is apparent from FIG. 2B that for low frequencies, the directivity of the corresponding acoustic signal is insufficient even when at a resonant frequency to be orientably detected, such as, for example, with a fiber optic detector.

Figure 3A:
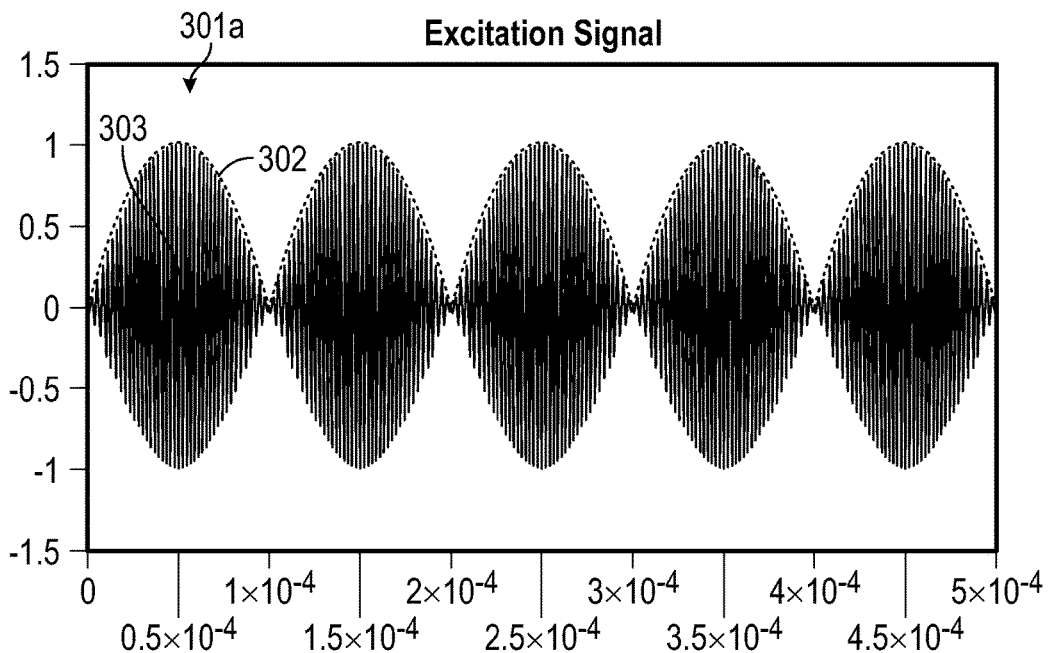
FIGS. 3A-3D illustrate signal characteristics of acoustic signals in accordance with embodiments of the present disclosure.

FIGS. 3A-3D illustrate signal characteristics of acoustic signals in accordance with embodiments of the present disclosure. FIG. 3A is a graphic illustration of the excitation signal represented in the time domain by curve 301, comprising a high frequency signal 302 modulated by a low frequency envelope 303, and represented as $$\sin(2\pi f_c t) \times \sin(2\pi f_b/2 t) \tag{1}$$

Figure 3B:
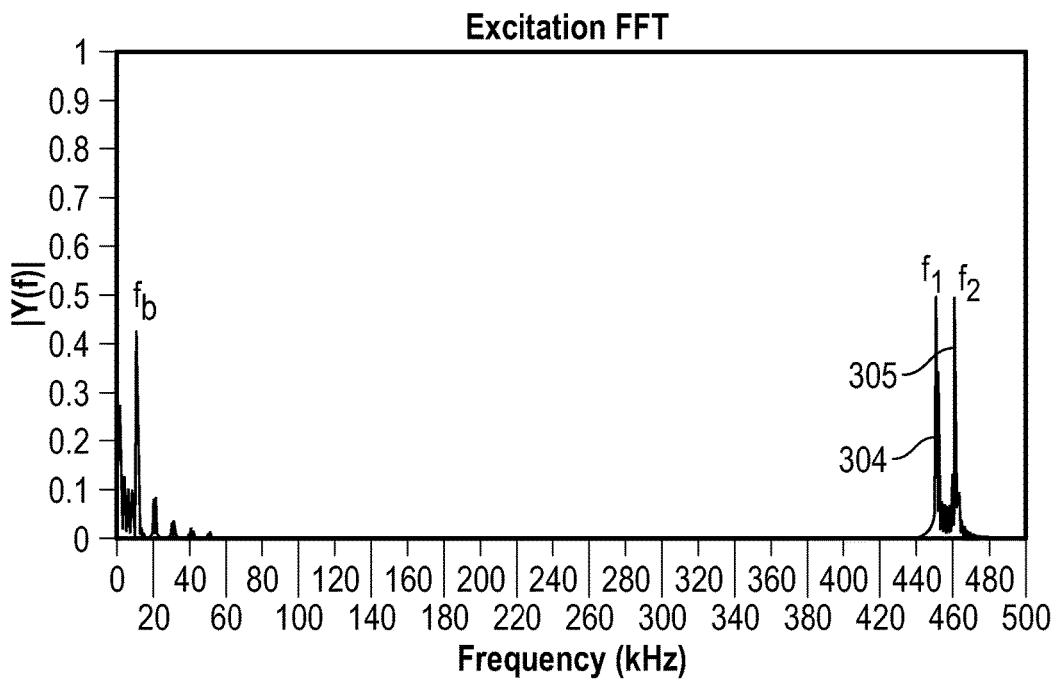
Figure 3C:
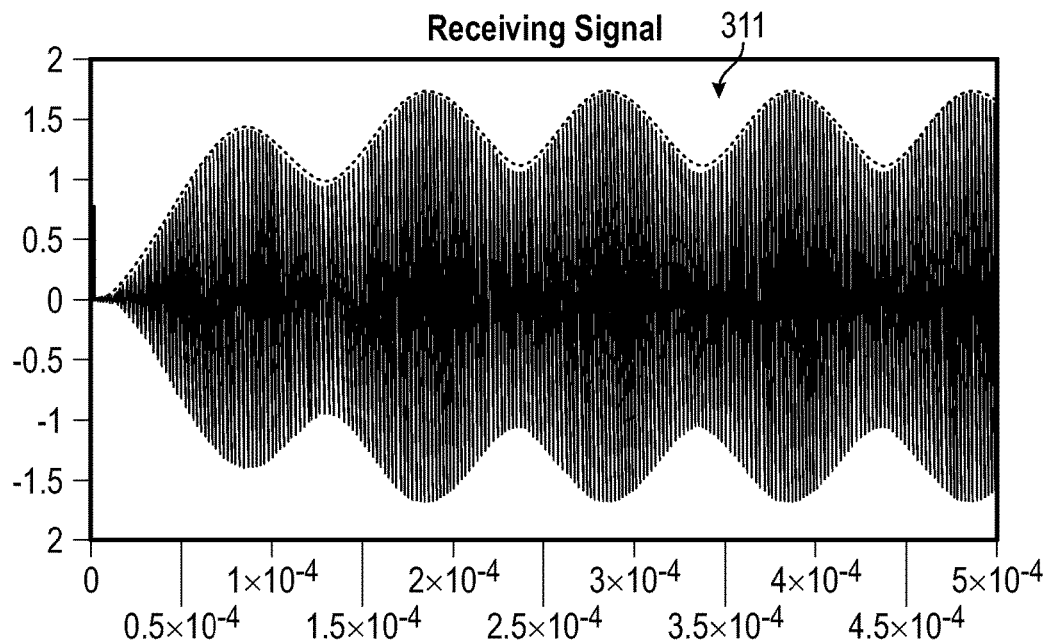
Figure 3D:
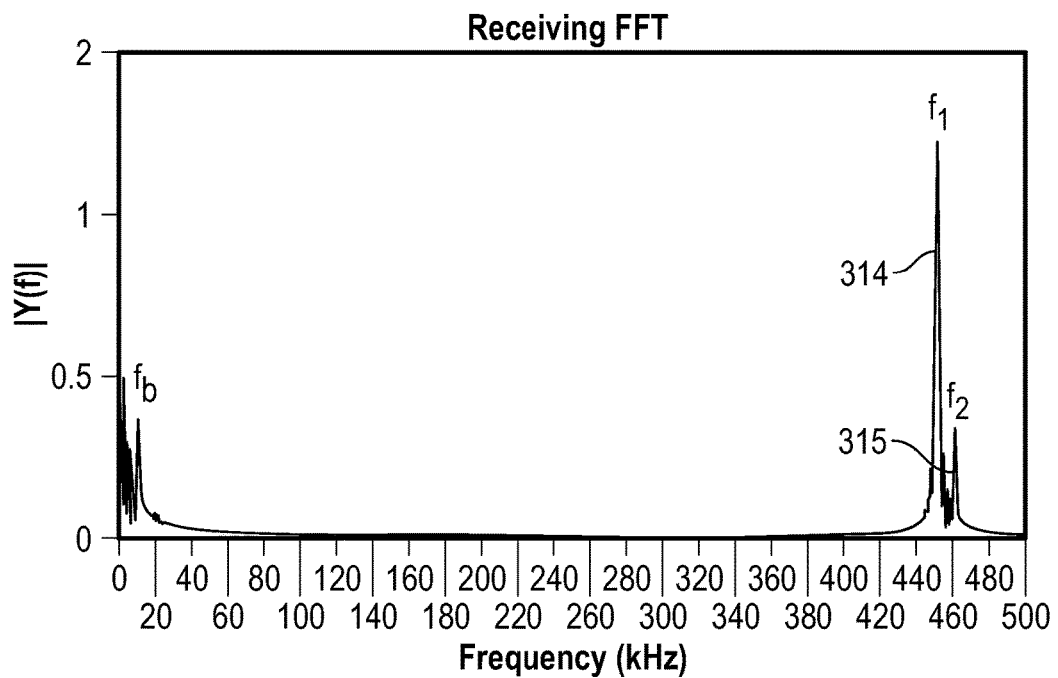

FIG. 3B illustrates the excitation signal 301 in the frequency domain. The excitation signal may include a first subsignal 304 at a first frequency ($f_1$) and a second subsignal 305 at a second frequency ($f_2$). The frequency spectrum of the envelope ($f_b$) is shown to be significantly lower. FIG. 3C is a graphic illustration of the received signal represented in the time domain by curve 311. FIG. 3D illustrates the received signal 311 in the frequency domain. The received signal may include a first received subsignal 314 at a first frequency ($f_1$) and a second received subsignal 315 at a second frequency ($f_2$). These signals may be predominant signals of a narrow spectrum. The frequency spectrum of the received envelope ($f_{rb}$) is shown to be significantly lower.

As shown here the excitation signal has a central frequency of 457 kHz and a practical envelope frequency of 10 kHz, as the envelope of the maxima and minima from constructive and destructive interference, respectively, has a practical frequency equal to the difference between the first frequency and the second frequency. This may be accomplished using a first excitation signal at 452 kHz and a second excitation signal of 462 kHz. This excitation signal may be generated initially as an electronic signal and fed to an acoustic system, or generated through acoustical mixing.

FIGS. 4A & 4B illustrate signal characteristics of signals in accordance with embodiments of the present disclosure. The results were obtained through simulation using a finite elemental analysis of a tool inside casing using the example dimensions given above with respect to FIG. 1B. The transducer selected had a diameter of 0.5 inches. A point probe fiber-optics receiver was modeled with an offset of 0.1 inches.

In other embodiments, the volume of interest evaluated comprises a plurality of nested conductive tubulars in the borehole, such as for example, production tubing. Estimating the property may comprise estimating a property corresponding to one or more tubular of the plurality of nested conductive tubulars. The property corresponding to each conductive tubular may include at least one of: i) location of the tubular; ii) thickness of the tubular; and iii) at least one property of a defect of the tubular; iv) a presence of a completion component outside at least one tubular; and v) a property of a completion component outside at least one tubular.

FIG. 4A shows a curve 401 representing absolute pressure value with respect to the central frequency of the excitation signal. Curve 401 indicates peaks 402a, 402b, 402c (local maxima) in pressure at frequencies corresponding with a resonant frequency. FIG. 4B shows a graphical indication of an azimuthal distribution of signal pressure for signals transmitted at each of the resonant frequencies, respectively. Curve 403 indicates the maximum amplitude of the pressure signal with respect to azimuth for an excitation signal having a 349 kHz central frequency. Curve 404 indicates the maximum amplitude of the pressure signal with respect to azimuth for an excitation signal having a 401 kHz central frequency. Curve 405 indicates the maximum amplitude of the pressure signal with respect to azimuth for an excitation signal having a 457 kHz central frequency. The full transmission frequency may be selected in accordance with the thickness of the tubular to be measured. It is apparent from FIG. 4B that the higher frequency of the signals of the present disclosure have greater directivity, constituting an acoustic beam suited to directional measurement.

The beam may be used for generating measurement information at at least one acoustic receiver on a logging tool in response to a plurality of acoustic reflections of the acoustic beam from at least one volume of interest in the formation. This measurement information may be used to estimate a property of the volume. Multitone beams generated using the techniques described herein exhibit a stronger beam with a beam width less than half (and in some cases less than one-third) of the low frequency beam with the same power applied. Thus, the novel beam allows deeper penetration into the formation with the same transducer specifications (or, alternatively, allows the same penetration with a lower power transducer).

Figure 5A:
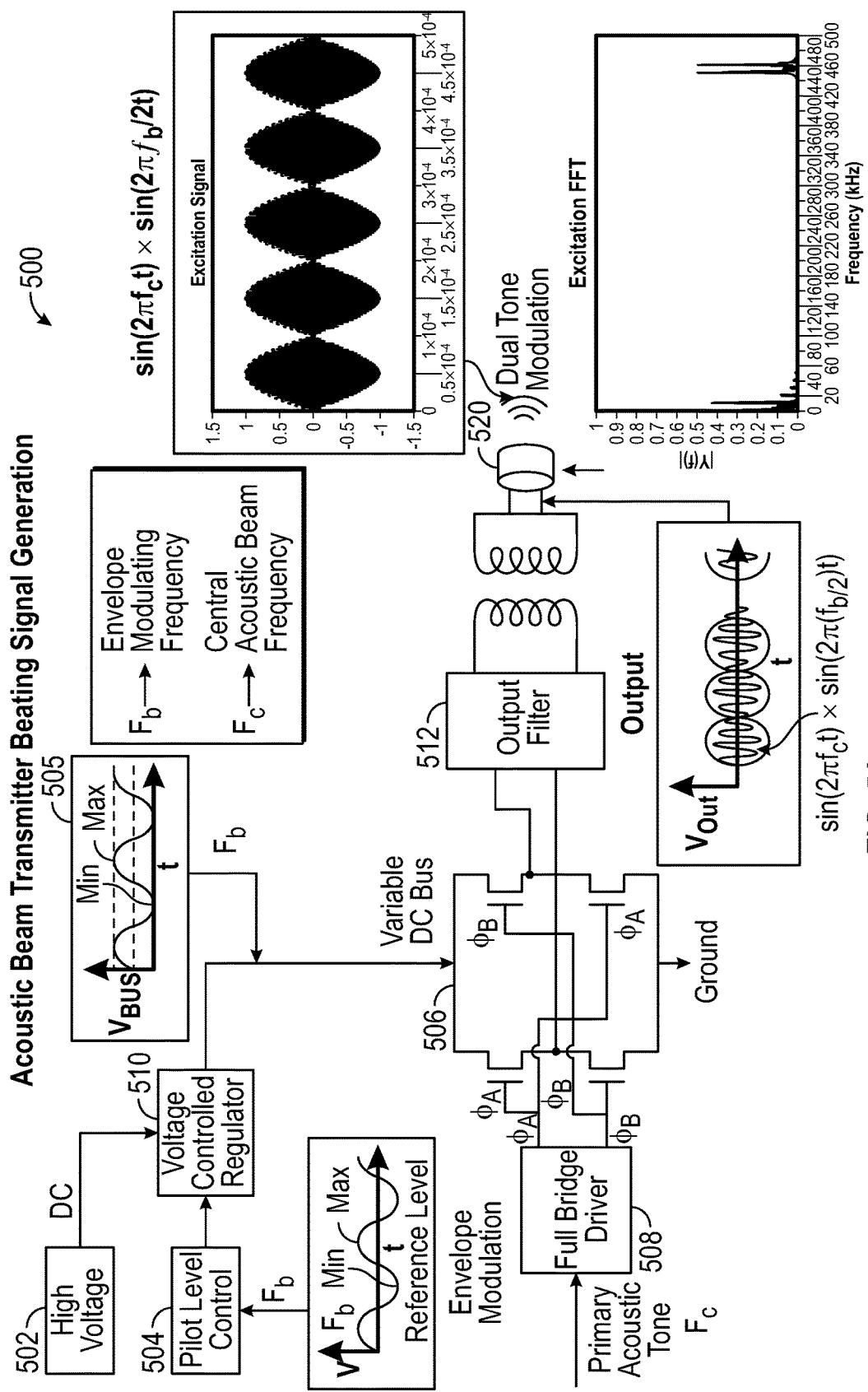
FIG. 5A shows a schematic diagram illustrating an instrument for use with a logging tool in accordance with embodiments of the present disclosure.

FIG. 5A shows a schematic diagram illustrating an instrument for use with a logging tool in accordance with embodiments of the present disclosure. Instrument 500 is configured to electrically generate signals which produce acoustic signals in accordance with the present disclosure via straightforward application to an acoustic device. These electrical signals, which may be expressed as $$\sin(2\pi f_c t) \times \sin(2\pi f_b/2t),$$

are then converted to like acoustic signals.

Instrument 500 comprises a full bridge driver 508 which generates sub-signals A and B on two outputs, although for multitone signals with more than two tones, additional sub-signals may be introduced to additional outputs. Circuitry operatively couples the output to a DC variable bus 506. The subsignals are pure tones (e.g., a single-frequency sinusoidal signal), which are generated at two different frequencies (e.g., $f_1$ and $f_2$).

A high voltage direct current ('DC') source 502 provides voltage for a voltage controlled regulator 510, which is controlled by a pilot level controller 504. The pilot level control 504 modulates the DC voltage provided to a variable DC bus 506 to establish the amplitude of the waveform $f_b$. The resulting signal is fed to a transducer 520 through an output filter 512. The low-frequency envelope may be tuned for optimal detection by fiber optic receivers (not shown). The excitation signal may also be swept to identify a resonant frequency corresponding to a tubular being investigated (e.g., casing). It will be apparent that the beam may alternatively be generated by generating low-frequency acoustic beat signals from interference of at least two high-frequency acoustic beams, such as, for example, those generated using separate acoustic transmitters (e.g., transducers).

Systems and methods as described above may be used for a variety of applications including high resolution imaging applications, such as, for example, ultrasonic ('US') casing transducer button array image inspection, and ultrasonic completion installation transducer button array image inspection; as well as applications leveraging imager pad sensor arrays, such as acoustic only imager button arrays; open hole imaging; LWD and MWD applications, including drill bit source implementations; dual-string applications; and underwater applications. Additionally, the techniques described herein may be employed for any downhole acoustic application wherein increased penetration coupled with high directivity is desired. One such application includes the acoustic excitation of embedded fiber optic sensors outside the casing (or other well completion components or embedded casing infrastructure features such as cables, electrical lines, hydraulic lines, and so on) for azimuthal position detection. This may be especially beneficial in connection with oriented perforation in order to avoid damage to installed sensor components.

An application that is especially suitable for techniques described above is the inspection and evaluation of downhole tubular, such as, for example, to detect corrosion, damage or other defects, particularly including casing integrity inspection. As described above, electromagnetic inspection is known, but inspection of multiple-liner and completion installations is problematic. The excited acoustic beams of the present disclosure may approximate the resonance frequency of different casing and cement layers, and enable multilayer casing structure determination, including multiple layer inner diameter (ID) and outer diameter (OD) estimation for casing, cement, or both, as well as estimation of azimuthal eccentricity and formation location.

General method embodiments include performing an inversion of a multi-frequency or transient 3D electromagnetic sensor array casing survey data of multiple downhole casing liners and completion installation components based on co-located high definition acoustic beam and EM flux data. Further aspects include improved instruments for measurement of EM flux data and application of these instruments for detecting and inspecting liners and installation components. Further, joint processing and interpretation of acoustic and magnetic flux leakage data may be carried out, for example, with the initial EM-based inversion structure defined by high azimuthal definition acoustic information generated with an oriented and rotating beam, as described above. That is, a geometric structural description of casing multiple liners and borehole (ID & OD of each casing liner; eccentricity of each liner; shape of each liner; potentially some defects; etc.) may be derived from acoustic data obtained using the multitone signals. This acoustically derived geometrical structural description may then be used to interpret data from electromagnetic instrumentation measurements performed in the same surrounding media volume, depth location and casing structures. Joint evaluation may include one dimensional (1D), two dimensional (2D) or three dimensional (3D) imaging processing and/or forward-model based inversion, and so on, and may be complemented with information from other logging auxiliary measurements, such as, for example, for the generation of boundary conditions. The detected beam reflection may be conventionally processed to detect azimuthal thickness of multiple tubulars (e.g., production tubing, first and second casing, etc.) as well as position, cement thickness, borehole diameter, bond quality, and so on. See, for example, U.S. Pat. No. 7,525,872 to Tang et al., U.S. Pat. No. 7,787,327 to Tang et al., U.S. Pat. No. 8,788,207 to Pei et al., U.S. Pat. No. 8,061,206 to Bolshakov, U.S. Pat. No. 9,103,196 to Zhao et al., and U.S. Pat. No. 6,896,056 to Mendez et al., each commonly owned with the present application and incorporated herein by reference in its entirety.

Methods include generating an electromagnetic (EM) field using an EM transmitter of the logging tool to produce interactions between the electromagnetic field and the plurality of nested conductive tubulars; obtaining EM measurements indicative of the interactions; and performing an inversion of the EM measurements using a forward model generated with the property corresponding to each conductive tubular. The interactions may comprise at least one of: i) magnetic flux leakage; and ii) induced eddy currents. Generating the electromagnetic (EM) field may be carried out by exciting an EM field using a first radially oriented EM transmitter at a first polarity and a second radially oriented EM transmitter at a second polarity opposite of the first polarity. Evaluation of the resulting measurements may be carried out in accordance with techniques known to those of skill in the art. See, for example, U.S. Pat. No. 7,403,000 to Barolak et al. and U.S. Pat. No. 7,795,864 to Barolak et al., each incorporated herein by reference in its entirety.

Figure 5B:
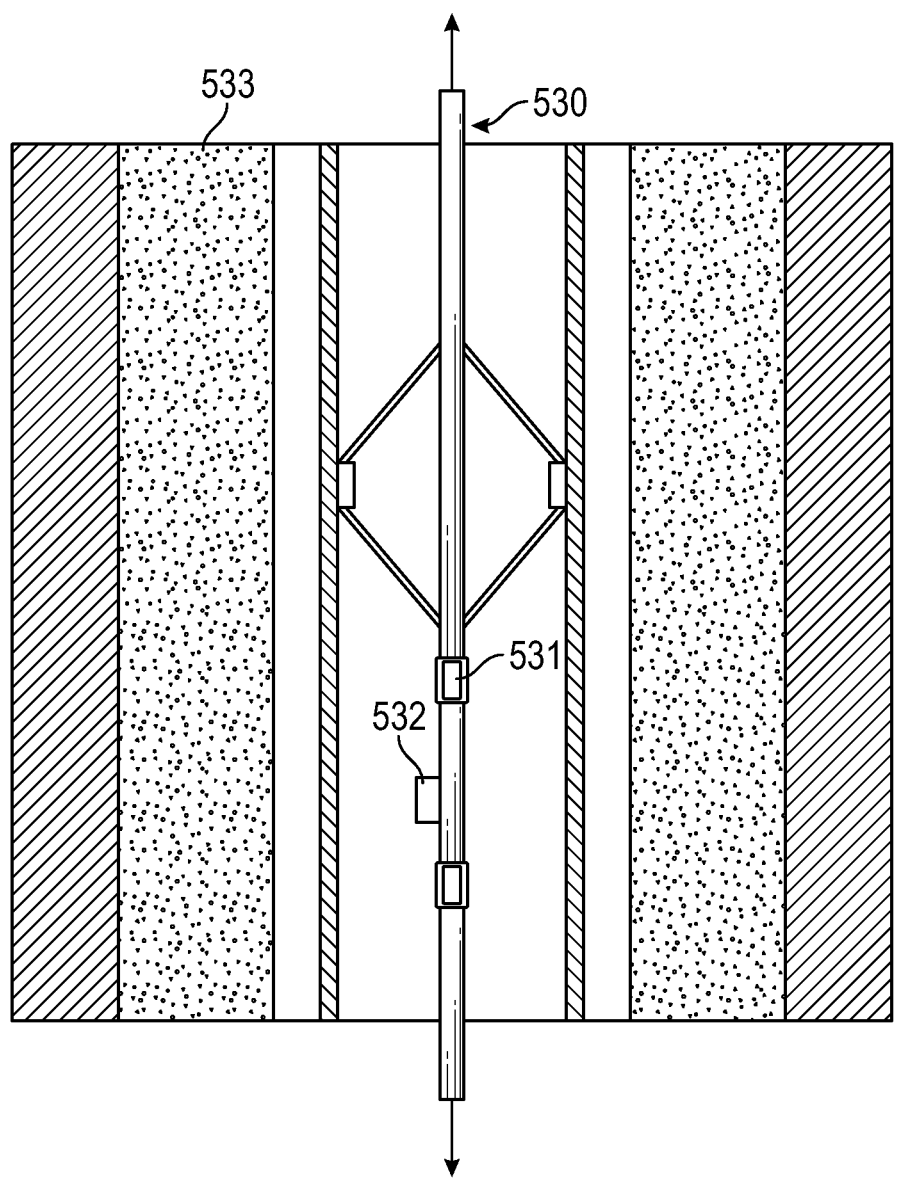
FIG. 5B illustrates a logging tool in accordance with embodiments of the present disclosure.

FIG. 5B illustrates a logging tool in accordance with embodiments of the present disclosure. The tool 530 may be connected with further downhole tools, above and/or below tool 530, such as perforation tools, stimulation tools, milling tools, rollers and so on, as part of a tool string. The tool 530 may be configured for conveyance in nested casing tubular 534a and 534b and configured to detect infrastructure features 533 exterior to the casing 534a and 534b. The tool 530 includes an acoustic beam transducer assembly 532 rotated by a motor section 531. A transient or multi-frequency EM 3D tool array 535 may reside between centralizer arms 536. The centralizer arms may urge a sensor array pad 537 against the inner wall of the innermost casing tubular. The sensor array pad 537 may include a magnetic flux detector and/or a pad-mounted acoustic beam transducer, as described in further detail below.

Figure 5C:
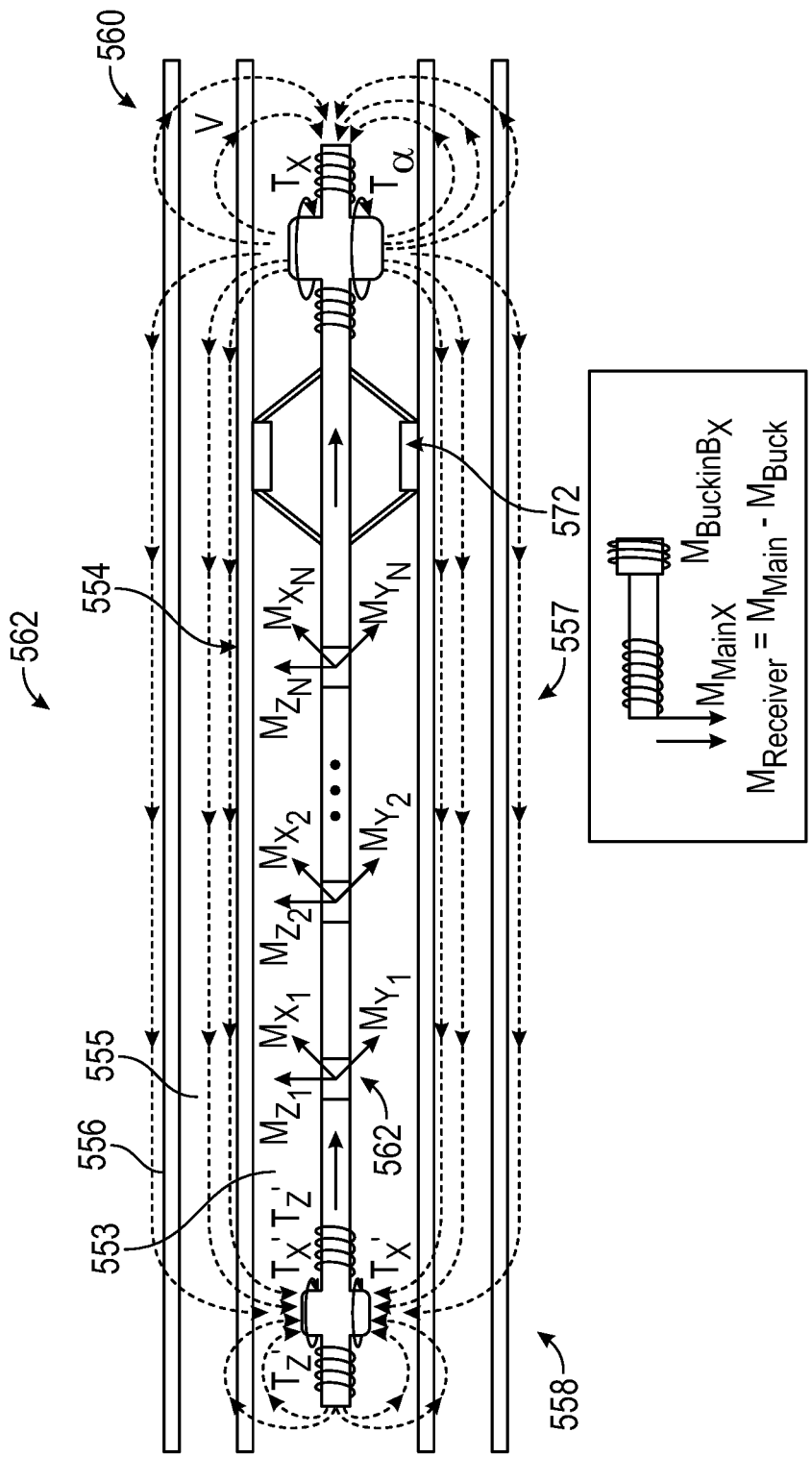
FIG. 5C illustrates another logging tool in accordance with embodiments of the present disclosure.

FIG. 5C illustrates another logging tool in accordance with embodiments of the present disclosure. The tool 562 is conveyed in a cased borehole. The annulus 553 between the tool and the casing 554 is filled with downhole fluid. The casing 554 is joined with the formation 556 by cement 555 in a borehole intersecting the formation 556.

The tool includes a tool array 557. At each end of the array 557 are an upper tri-axial transmitter 558 and a lower tri-axial transmitter 560. Each tri-axial transmitter comprises three orthogonal transmitters referred to as the Tx, Tz, and Ty (or Tx', Ty', and Tz', respectively). The z-axis is the longitudinal axis of the tool. A plurality of 3D focused tri-axial coil receiver arrays 562 ($M_1 \ldots M_N$) may be positioned along the tool between the tri-axial transmitters. All coils are mounted in a tool structural member comprising a material configured to make the structural coil support the preferred path of magnetic flux inside the tubular as indicated by arrows in FIG. 5C. The individual component coil receivers (e.g., z-component) may be referred to as $Mz_1 \ldots Mz_N$. A pad-mounted 3D tri-axial Micro-Electro-Mechanical Systems (MEMS) flux leakage and magnetic field sensor array 572 is mounted below the receiver arrays and above the lower tri-axial transmitter 560. The extendable and retractable pads 572a may be deployed next to casing using extending devices 577 or the like. The tool may be configured for measurements at multiple frequencies or time domain transient measurements.

In operation, the tool 562 may perform magnetic cased well surveys using frequency and spatially focused interpretation and inversion methods using a forward model generated based on knowledge of a specific cased well structure. The interpretation and inversion methods resolve geometry and material properties not defined with a priori knowledge. Acoustic data obtained in accordance with the above embodiments may be used to generate the forward model. The 3D tri-axial upper transmitter 558 focuses surveying magnetic fluxes radially into the casing structure 554 to be circulated back through the 3D tri-axial lower transmitter 560. The 3D EM tri-axial MEMS sensors of array 572 may be configured to sense magnetic flux leakages, current induced magnetic field, and other magnetic flux disturbances of the cased well structure and construction near the inner cased surface ID. The dual transmitter arrangement tri-axially focuses magnetic flux towards the shallower and deeper cased well structures with the assistance of a range of operating frequencies. More complex well structures and features can be surveyed with more data measurements obtained by more sensors, frequencies, transmitters and receiver arrays (pad and tool body mounted), as would occur to those of skill in the art.

In other embodiments EM components may be embedded in a tool pad arm, such as, for example, an inductive coil inside the pad with a moment perpendicular to the casing inner wall surface as shown in FIG. 5B.

Figure 5D:
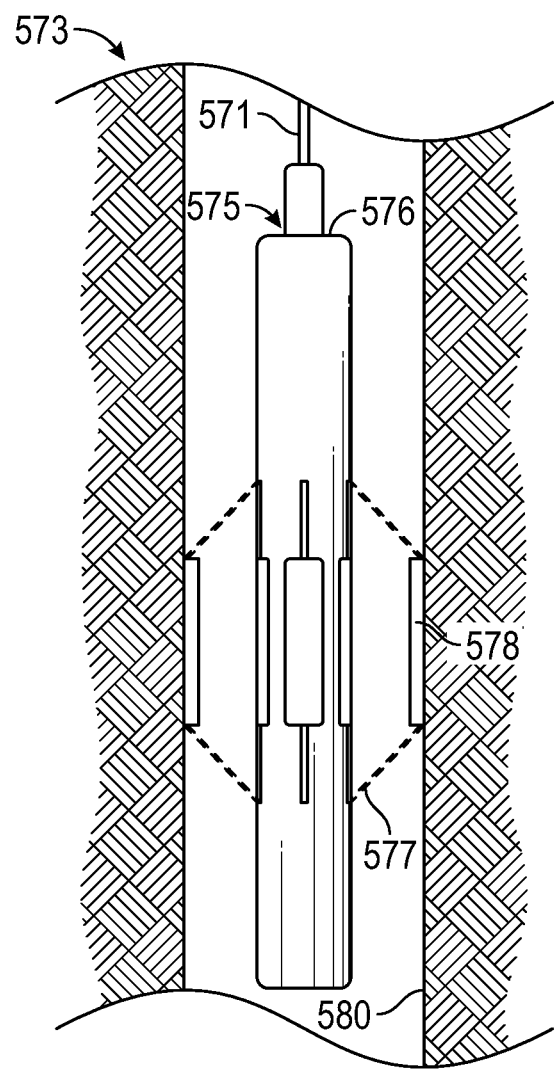
FIG. 5D illustrates another logging tool in accordance with embodiments of the present disclosure.

FIG. 5D illustrates another logging tool in accordance with embodiments of the present disclosure. The logging tool 575 has a number of extendable pads (e.g., from 4-6 pads or more) which. The tool 300 may be disposed on carrier 571 intersecting the earth formation 573. The tool 575 may include a body (e.g., BHA, housing, enclosure, drill string, wireline tool body) 576 having pads 578 extended on extension devices 577. Four pads are shown for illustrative purposes and, in actual practice, there may be more or fewer pads, such as two pads, three pads (e.g., separated by about 120 degrees circumferentially), or six pads (e.g., separated by about 60 degrees). The extension devices may be electrically operated, electromechanically operated, mechanically operated or hydraulically operated. With the extension devices fully extended, the pads may engage the wellbore 580 and make measurements indicative of at least one parameter of interest of the earth formation or wellbore infrastructure (e.g., casing). Such devices are well-known in the art. See, for example, U.S. Pat. No. 7,228,903 to Wang et al., hereby incorporated by reference in its entirety.

Pads 578 may include a face configured to engage the wellbore 580 (e.g., casing). The term "engage," as used herein, may be defined as in contact with the wellbore 580, urged against the wellbore 580, or positioned proximate the wellbore 580. The term "proximate," as used herein, may be defined as the pad being near the wellbore 580 such that measurements may be taken from the pad that are useful in evaluating the wellbore, earth formation, or both. The term "face" refers to the surface, edge, or side of the tool body or pad that is closest to the wellbore surface (e.g., casing wall or borehole wall).

Figure 6A:
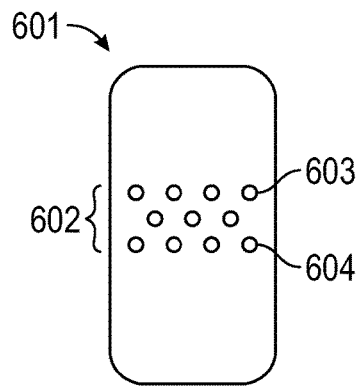
FIGS. 6A-6F illustrate measurement techniques using pads in accordance with embodiments of the present disclosure.

FIGS. 6A-6F illustrate measurement techniques using pads in accordance with embodiments of the present disclosure. FIG. 6A illustrates a pad 601 including sensors 602 incorporated on its face. Sensors 602 may all be electrical sensors, such as, for example, button electrodes configured to sense voltage, current, or both voltage and current; all acoustic sensors configured for dual-beam detection as described herein; or combinations of the two sensor types (i.e. acoustic and resistivity button sensors). For example, sensors 603 of the top row may be acoustic sensors, while the remaining sensors 604 may be resistivity sensors, forming a hybrid sensor array. Pad 601 is merely illustrative and is not restricted to the array geometry arrangement shown.

Figure 6B:
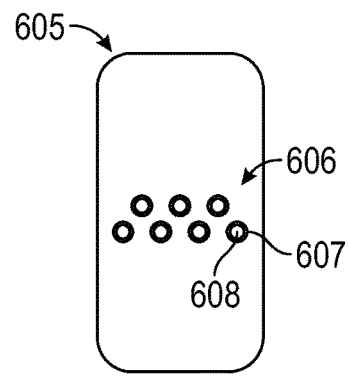
Figure 6C:
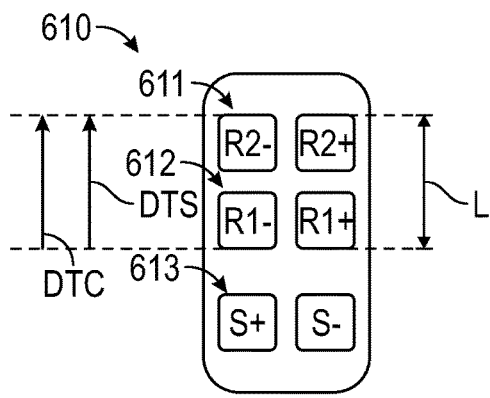
Figure 6D:
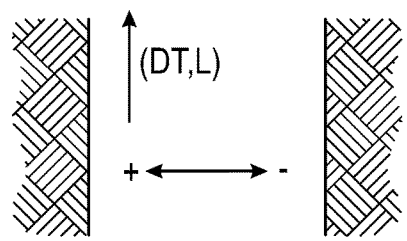
Figure 6E:
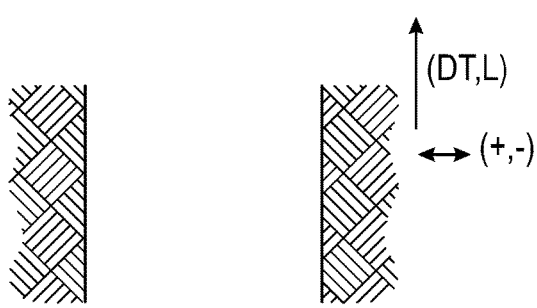
Figure 6F:
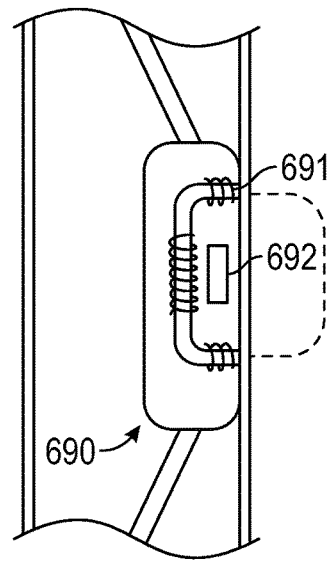

FIG. 6B illustrates a pad 605 having compound sensors array 606. Compound sensors include an acoustic transducer 608 which is surrounded by an EM sensor component 607 formed by a galvanic sensor, a micro coil sensor, or an EM MEMS built-in sensor. The EM component may be implemented as an electrode, coil antenna, or the like. Pad 605 is merely illustrative and is not restricted to the array geometry arrangement shown. FIG. 6C illustrates a pad 610 configured to measure shear and compressional slowness. Pad 610 includes a set of acoustic source transducers 613 for generating the acoustic signal, a first set of acoustic receivers 611 at a first distance from the source receivers, and a second set of acoustic receivers 612 at a second distance from the source receivers that is different than the first distance. Either a shear wave or compression wave may be generated using the acoustic source transducers 613, e.g., by differentially driving them or commonly driving them. By measuring travel time differences between the two sets of receivers shear slowness (DTS) and compression slowness (DTC) of the formation may be estimated. The differences in shear and compression wave propagation are shown in FIGS. 6D & 6E. Extendable pads 578 could be mounted with different sensor arrays 601, 605 or 610. These pad measurements may be acquired with orientation data within the borehole provided by a calibrated directional package including 3D triaxial accelerometers and 3D triaxial magnetometers for example. FIG. 6F shows a pad 690 with coils 691 radially and longitudinally oriented and mounted on a pad's internal structure shown in pad 690 comprising a preferred path to guide the magnetic flux detected 693. Pad 690 contains in its internal structure a triaxial 3D EM MEMS sensor 692.

Aspects of the present disclosure are subject to application in various different embodiments. In some general embodiments, carrier 15 is implemented as a tool string of a drilling system, and measurements taken in the borehole may be characterized as "logging-while-drilling" (LWD) or "measurement-while-drilling" (MWD) operations.

Figure 7A:
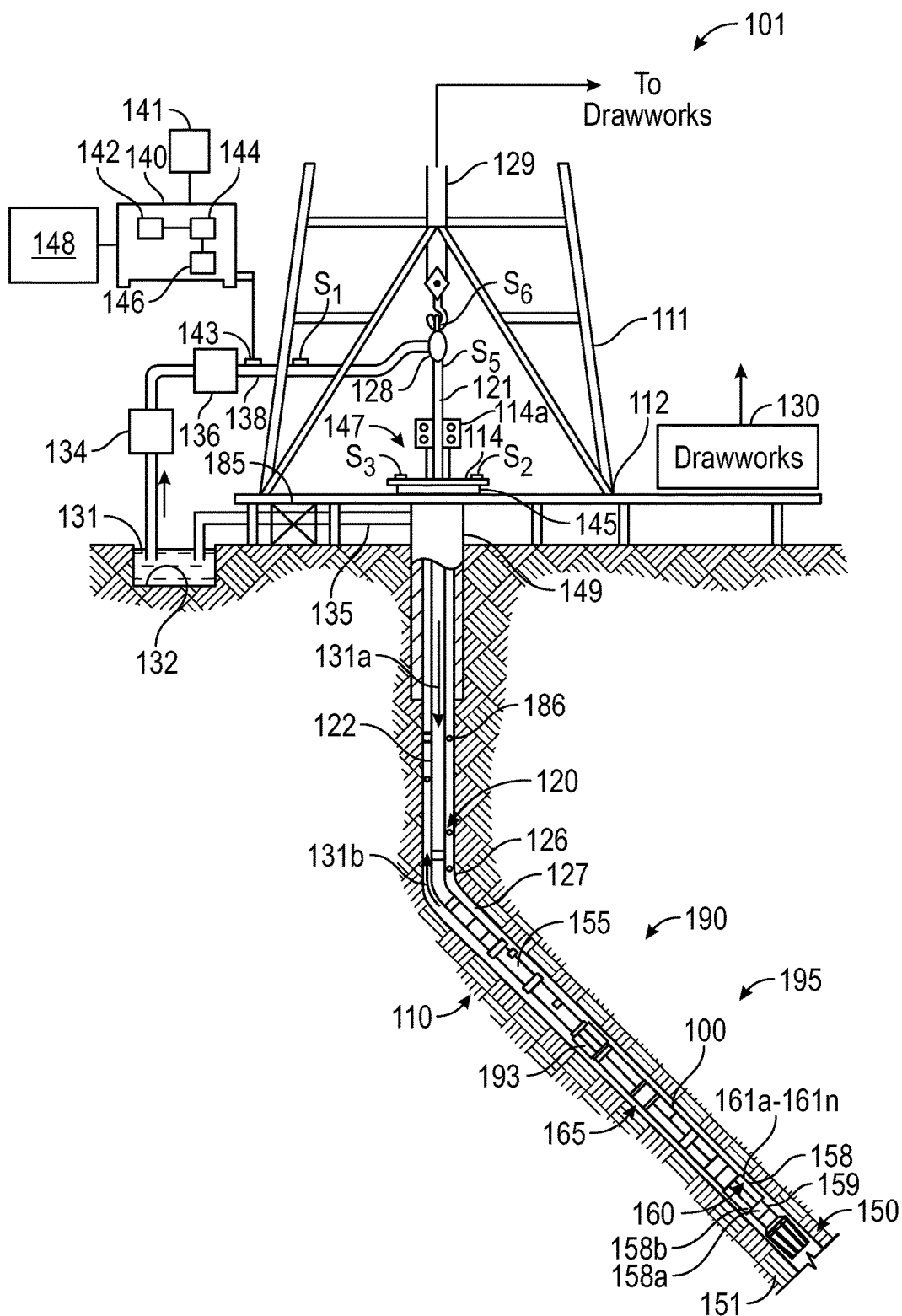
FIGS. 7A-7D techniques for evaluation of an earth formation using measurements from an acoustic logging instrument on a drilling system in accordance with embodiments of the present disclosure.

FIGS. 7A-7D techniques for evaluation of an earth formation using measurements from an acoustic logging instrument on a drilling system in accordance with embodiments of the present disclosure. FIG. 7A shows an exemplary embodiment of a drilling system for evaluation of an earth formation in accordance with embodiments of the present disclosure. The system 701 includes a carrier 711 that is shown disposed in a wellbore or borehole 726 that penetrates at least one earth formation 795. The system 701 also includes a tool 710 configured for taking multitone measurements in the borehole.

As described herein, "borehole" or "wellbore" refers to a single hole that makes up all or part of a drilled well. Depending on the configuration, the system 701 may be used during drilling and/or after the wellbore 712 has been formed, including, in some instances after the installation of casing or production infrastructure. While a land system is shown, the teachings of the present disclosure may also be utilized in offshore or subsea applications. As described herein, "formations" refer to the various features and materials that may be encountered in a subsurface environment and surround the borehole. The term "information" includes, but is not limited to, raw data, processed data, and signals.

FIG. 7A is a schematic diagram of an exemplary drilling system 701 according to one embodiment of the disclosure. FIG. 7A shows a drill string 720 that includes a bottomhole assembly (BHA) 190 conveyed in a borehole 126. The drilling system 701 includes a conventional derrick 711 erected on a platform or floor 712 which supports a rotary table 714 that is rotated by a prime mover, such as an electric motor (not shown), at a desired rotational speed. A tubing (such as jointed drill pipe 722), having the drilling assembly 790, attached at its bottom end extends from the surface to the bottom 751 of the borehole 726. A drill bit 750, attached to drilling assembly 790, disintegrates the geological formations when it is rotated to drill the borehole 726. The drill string 720 is coupled to a drawworks 730 via a Kelly joint 721, swivel 728 and line 729 through a pulley. Drawworks 730 is operated to control the weight on bit ("WOB"). The drill string 720 may be rotated by a top drive (not shown) instead of by the prime mover and the rotary table 714. Alternatively, a coiled-tubing may be used as the tubing 722. A tubing injector 714a may be used to convey the coiled-tubing having the drilling assembly attached to its bottom end. The operations of the drawworks 730 and the tubing injector 714a are known in the art and are thus not described in detail herein.

A suitable drilling fluid 731 (also referred to as the "mud") from a source 732 thereof, such as a mud pit, is circulated under pressure through the drill string 720 by a mud pump 734. The drilling fluid 731 passes from the mud pump 734 into the drill string 720 via a desurger 736 and the fluid line 738. The drilling fluid 731a from the drilling tubular discharges at the borehole bottom 751 through openings in the drill bit 750. The returning drilling fluid 731b circulates uphole through the annular space 727 between the drill string 720 and the borehole 726 and returns to the mud pit 732 via a return line 735 and drill cutting screen 785 that removes the drill cuttings 786 from the returning drilling fluid 731b. A sensor S1 in line 738 provides information about the fluid flow rate. A surface torque sensor S2 and a sensor S3 associated with the drill string 720 respectively provide information about the torque and the rotational speed of the drill string 720. Tubing injection speed is determined from the sensor S5, while the sensor S6 provides the hook load of the drill string 720.

Well control system 747 is placed at the top end of the borehole 726. The well control system 747 includes a surface blow-out-preventer (BOP) stack 715 and a surface choke 749 in communication with a wellbore annulus 727. The surface choke 749 can control the flow of fluid out of the borehole 726 to provide a back pressure as needed to control the well.

In some applications, the drill bit 750 is rotated by only rotating the drill pipe 722. However, in many other applications, a downhole motor 755 (mud motor) disposed in the BHA 790 also rotates the drill bit 750. The rate of penetration (ROP) for a given BHA largely depends on the WOB or the thrust force on the drill bit 750 and its rotational speed.

A surface control unit or controller 740 receives signals from the downhole sensors and devices via a sensor 743 placed in the fluid line 738 and signals from sensors S1-S6 and other sensors used in the system 701 and processes such signals according to programmed instructions provided to the surface control unit 740. The surface control unit 740 displays desired drilling parameters and other information on a display/monitor 741 that is utilized by an operator to control the drilling operations. The surface control unit 740 may be a computer-based unit that may include a processor 742 (such as a microprocessor), a storage device 744, such as a solid-state memory, tape or hard disc, and one or more computer programs 746 in the storage device 744 that are accessible to the processor 742 for executing instructions contained in such programs. The surface control unit 740 may further communicate with a remote control unit 748. The surface control unit 740 may process data relating to the drilling operations, data from the sensors and devices on the surface, data received from downhole, and may control one or more operations of the downhole and surface devices. The data may be transmitted in analog or digital form.

The BHA 790 may also contain formation evaluation sensors or devices (also referred to as measurement-while-drilling ("MWD") or logging-while-drilling ("LWD") sensors) determining resistivity, density, porosity, permeability, acoustic properties, nuclear-magnetic resonance properties, formation pressures, properties or characteristics of the fluids downhole and other desired properties of the formation 795 surrounding the BHA 790. Such sensors are generally known in the art and for convenience are generally denoted herein by numeral 765. The BHA 790 may further include a variety of other sensors and devices 759 for determining one or more properties of the BHA 790 (such as vibration, bending moment, acceleration, oscillations, whirl, stick-slip, etc.), drilling operating parameters (such as weight-on-bit, fluid flow rate, pressure, temperature, rate of penetration, azimuth, tool face, drill bit rotation, etc.). For convenience, all such sensors are denoted by numeral 759.

The BHA 790 may include a steering apparatus or tool 758 for steering the drill bit 750 along a desired drilling path. In one aspect, the steering apparatus may include a steering unit 760, having a number of force application members 761a-761n. The force application members may be mounted directly on the drill string, or they may be at least partially integrated into the drilling motor. In another aspect, the force application members may be mounted on a sleeve, which is rotatable about the center axis of the drill string. The force application members may be activated using electro-mechanical, electro-hydraulic or mud-hydraulic actuators. In yet another embodiment the steering apparatus may include a steering unit 758 having a bent sub and a first steering device 758a to orient the bent sub in the wellbore and the second steering device 758b to maintain the bent sub along a selected drilling direction. The steering unit 758, 760 may include near-bit inclinometers and magnetometers.

The drilling system 701 may include sensors, circuitry and processing software and algorithms for providing information about desired drilling parameters relating to the BHA, drill string, the drill bit and downhole equipment such as a drilling motor, steering unit, thrusters, etc. Many current drilling systems, especially for drilling highly deviated and horizontal wellbores, utilize coiled-tubing for conveying the drilling assembly downhole. In such applications a thruster may be deployed in the drill string 790 to provide the required force on the drill bit.

Exemplary sensors for determining drilling parameters include, but are not limited to drill bit sensors, an RPM sensor, a weight on bit sensor, sensors for measuring mud motor parameters (e.g., mud motor stator temperature, differential pressure across a mud motor, and fluid flow rate through a mud motor), and sensors for measuring acceleration, vibration, whirl, radial displacement, stick-slip, torque, shock, vibration, strain, stress, bending moment, bit bounce, axial thrust, friction, backward rotation, BHA buckling, and radial thrust. Sensors distributed along the drill string can measure physical quantities such as drill string acceleration and strain, internal pressures in the drill string bore, external pressure in the annulus, vibration, temperature, electrical and magnetic field intensities inside the drill string, bore of the drill string, etc. Suitable systems for making dynamic downhole measurements include COPILOT, a downhole measurement system, manufactured by BAKER HUGHES INCORPORATED.

The drilling system 701 can include one or more downhole processors at a suitable location such as 793 on the BHA 790. The processor(s) can be a microprocessor that uses a computer program implemented on a suitable non-transitory computer-readable medium that enables the processor to perform the control and processing. The non-transitory computer-readable medium may include one or more ROMs, EPROMs, EAROMs, EEPROMs, Flash Memories, RAMs, Hard Drives and/or Optical disks. Other equipment such as power and data buses, power supplies, and the like will be apparent to one skilled in the art. In one embodiment, the MWD system utilizes mud pulse telemetry to communicate data from a downhole location to the surface while drilling operations take place. The surface processor 742 can process the surface measured data, along with the data transmitted from the downhole processor, to evaluate formation lithology. While a drill string 720 is shown as a conveyance device for sensors 765, it should be understood that embodiments of the present disclosure may be used in connection with tools conveyed via rigid (e.g. jointed tubular or coiled tubing) as well as non-rigid (e. g. wireline, slickline, e-line, etc.) conveyance systems. The drilling system 701 may include a bottomhole assembly and/or sensors and equipment for implementation of embodiments of the present disclosure on either a drill string or a wireline.

A point of novelty of the system illustrated in FIG. 7A is that the surface processor 742 and/or the downhole processor 793 are configured to perform certain methods (discussed below) that are not in the prior art. Surface processor 742 or downhole processor 793 may be configured to control mud pump 734, drawworks 730, rotary table 714, downhole motor 755, other components of the BHA 790, or other components of the drilling system. Surface processor 742 or downhole processor 793 may be configured to control sensors described above and to estimate a parameter of interest according to methods described herein.

Control of these components may be carried out using one or more models using methods described below. For example, surface processor 742 or downhole processor 793 may be configured to modify drilling operations i) autonomously upon triggering conditions, ii) in response to operator commands, or iii) combinations of these. Such modifications may include changing drilling paramaters, mud parameters, and so on. Control of these devices, and of the various processes of the drilling system generally, may be carried out in a completely automated fashion or through interaction with personnel via notifications, graphical representations, user interfaces and the like. Additionally or alternatively, surface processor or downhole processor may be configured for the creation of the model. Reference information accessible to the processor may also be used.

In some general embodiments, surface processor 742, downhole processor 793, or other processors (e.g. remote processors) may be configured to use at least one sensor to produce a corresponding signal, responsive in part to a reflection of an emitted wave, from each of a plurality of azimuthally distributed orientations about a BHA. In some general embodiments, surface processor 742, downhole processor 793, or other processors (e.g. remote processors) may be configured to operate the tool 710 to excite and measure acoustic signals containing pulse echoes.

Mathematical models, look-up tables, or other models representing relationships between the signals and the values of the formation properties may be used to characterize operations in the formation or the formation itself, optimize one or more operational parameters of a production or development, and so on. The system may carry out these actions through notifications, advice, and/or intelligent control.

Figure 7B:
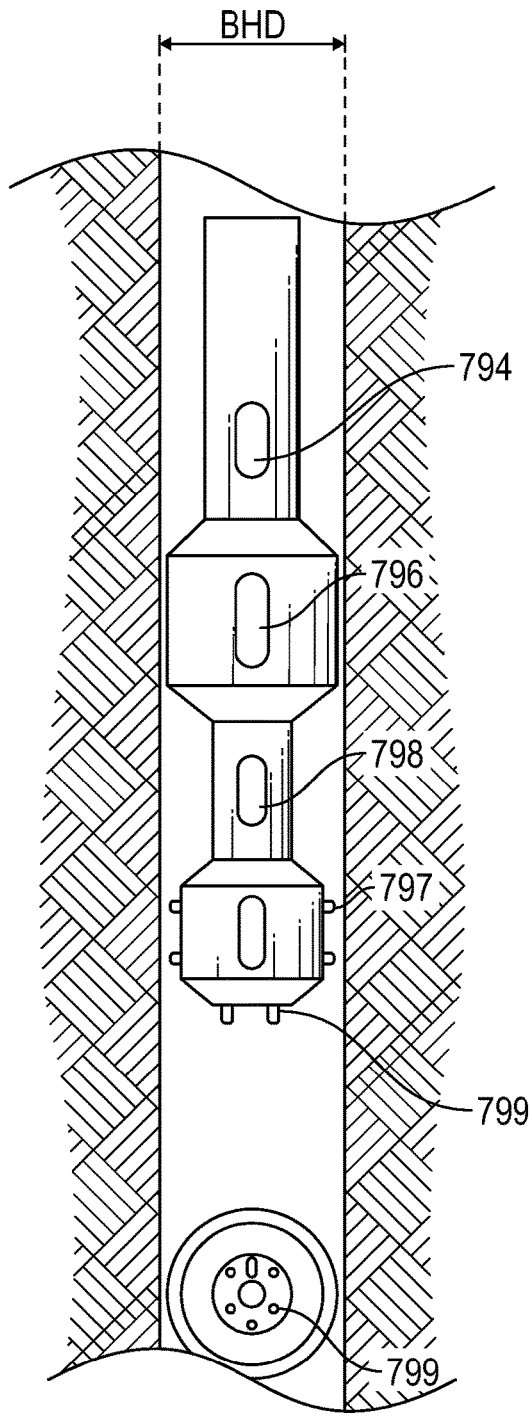

FIG. 7B shows the BHA 790 at the distal end. The BHA includes an acoustic button array imager near or structurally combined with drill bit cutter. The BHA 790 includes a bit 720 including side-facing sensors 797 and ahead-of-bit sensors 799. The acoustic imager button array may be stand-alone, or may include concentrically collocated acoustic (e.g., structurally embedded piezoelectric body receiver and transmitter) and resistivity (e.g., structurally embedded metallic ring) imager buttons. Operational frequency ranges may differ for the resistivity imager in oil based mud (OBM) applications (e.g., EM frequencies of 5 to 100 MHz for the high frequency) and water based mud (WBM) (e.g., conductive mud) applications (e.g., 1 to 20 kHz). Front-facing ahead-of-bit sensors 799 include acoustic transducers configured to estimate properties forward of the bit in the drilling direction, and side-facing sensors 797 are configured to estimate properties in a direction of a lateral surface (e.g., a borehole wall). The sensors may be configured for pitch-catch operation. Higher acoustic carrier frequencies (e.g., 100-500 kHz) may be used to collimate the lower frequency. A 3D composite derived image interpretation of side-facing sensors 797 and ahead-of-bit sensors 799 may be used to develop strike (FIG. 7D) and dip (FIG. 7C) angles referenced to a directional package 798 included in the tool string (e.g., assembled in the drill string as appropriate, such as, for example, just above drill bit). The directional package 798 may include, but is not limited to, 3D triaxial accelerometers and magnetometers. The drill-bit front face and side face mounted sensor arrays can be sensor arrays types corresponding to sensors 601, 605 and 610. These sensor measurements, which may be taken in two perpendicular surfaces, may be referenced to a directional package, a drill bit cutter orientation (e.g., cutter 1), and a tool face measurement, and may therefore provide 3D multi-dimensionally oriented measurements.

Likewise sensor array 796, shown above the directional package 798, may be mounted in a drill string stabilizer, and may be configured to duplicate or replace the functionality of any of the sensor arrays above. Likewise these sensor arrays 794 may be mounted in a drill string sub body above the stabilizer and may duplicate or replace the functionality of sensor arrays 601 and 605.

Figure 7C:
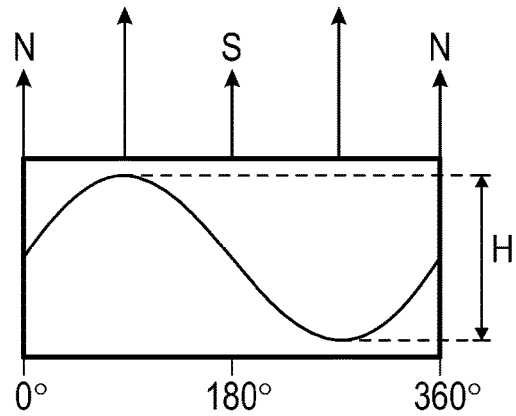
Figure 7D:
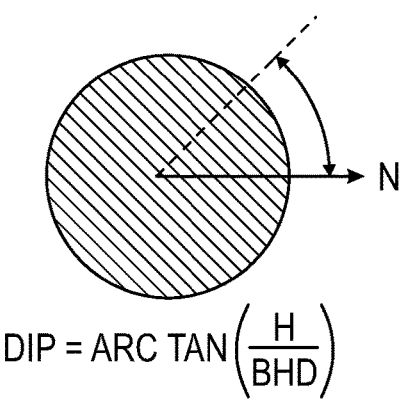

FIGS. 7C & 7D illustrate how borehole acoustic measurement can obtain geological structural information. The BHA 790 comprises an reservoir directional survey package embedded in the bit or mounted in the drilling bottom hole assembly behind the bit including 3D accelerometer and magnetometer—3D composite image derived dip and strike angles may be oriented by the reservoir directional survey package under structurally and directionally correlated constraints with the drilling bottom hole assembly. Images may be spatially oriented with respect to a reference drill bit cutter and the reference drill bit cutter spatial orientation referenced to the reservoir directional survey package. The generated 3D images and reference drill bit cutter spatial orientations may be referenced via direct orientation calibration with the directional orientation package or transferred calibration through precision keyed mechanical connections or other precision orientation relational means and methods (e.g., near-localizer EM 3D transducer orientation sensors).

Magnetometers in a Measurement-While-Drilling (MWD) sensor unit (MWDU) may take measurements during drilling operations. The toolface and the inclination angle may be determined from the accelerometer measurements. The azimuth may be determined from the magnetometer measurements in conjunction with the tool face and inclination angle. As used herein, the term "toolface" means the orientation angle of the bent housing or sub in the borehole with respect to a reference such as high side of the borehole which indicates the direction in which the borehole will be curving. In case of drilling with a rotary steerable drilling tool, the term "toolface" means the orientation of a reference feature of the steering tool, e.g. one of the steering ribs on a non-rotating sleeve, with respect to another reference such as high side of the borehole, which is used to determine the desired distribution of steering forces for deflecting the borehole in a desired direction. The inclination angle is the angle between the borehole axis and the vertical (direction of the gravity field). The azimuth is the angle between the horizontal projection of the borehole axis and a reference direction such as magnetic north or absolute north.

Composite 3D images may be used to derive strike and dip with a corresponding inferred reservoir structural and layer description associated having lithological and geological characterization of the structure and composition of a reservoir. Multi-well horizon correlation, real-time geological drilling well placement guidance, and well path steering feedback corrections may also be conducted using the strike and dip data.

U.S. Pat. No. 7,035,165 to Tang having the same assignee as the present disclosure and the contents of which are incorporated herein by reference discloses a method in which a plurality of multicomponent acoustic measurements are obtained at a plurality of depths and for a plurality of source-receiver spacings on the logging tool. An orientation sensor on the logging tool, such as a magnetometer, may be used for obtaining an orientation measurement indicative of an orientation of the logging tool. The multicomponent measurements are rotated to a fixed coordinate system (such as an earth based system defined with respect to magnetic or geographic north) using the orientation measurement, giving rotated multicomponent measurements. The rotated multi-component measurements are processed for providing an image of the subsurface. While the waves of the present disclosure are not specifically discussed in Tang, examples shown by Tang illustrate the use of directional signals for good signal-to-noise ratio for imaging of interfaces, e.g., bed boundaries.

Depicted above is a logging tool having one or more sources. In embodiments, as the tool crosses a dipping bed or other acoustic boundary intersecting the borehole, acoustic signals as described above may be used to identify parameters of the boundary. As an acoustic source on the tool is energized, it generates acoustic waves that can be classified into two categories according their propagation direction. The first is the waves that travel directly along the borehole (e.g., Stoneley waves). These direct waves are received by an array of receivers (not shown) on the tool and subsequently used to obtain acoustic parameters, such as velocity, attenuation, and anisotropy, etc., for the formation adjacent to the borehole. The waves of the second category are the acoustic energy that radiates away from the borehole and reflects back to the borehole from boundaries of geological structures. These waves are called secondary arrivals in acoustic logging data because their amplitudes are generally small compared to those of the direct waves. Depending on whether the tool is below or above the bed, acoustic energy strikes the lower or upper side of the bed and reflects back to the receiver as the secondary arrivals.

Azimuthal ambiguity may be resolved using directional acoustic measurements in a borehole. U.S. Pat. No. 4,649,525 to Angona et al discloses the use of a dipole acoustic logging for determination of formation shear velocities. With a directional wave, generated or received wave amplitude A depends on the angle θ between the wave's associated particle motion direction (polarization) and the source or receiver orientation, and may be denoted by $$A \propto \cos \theta. \qquad (1)$$

With this directionality, oriented source(s) and/or receiver(s) may be used to generate and record acoustic wave energy. An acoustic measurement made in this way is called the directional measurement. In fact, the directionality property of the dipole source/receiver has been utilized to determine formation azimuthal shear-wave anisotropy. In the present invention, the directionality of the wave amplitudes, as measured by a directional acoustic system, may be used to determine the azimuth of a near-borehole structure.

U.S. Pat. No. 8,055,448 B2 to Mathiszik et al., having the same assignee as the present disclosure and the contents of which are incorporated herein by reference, discloses further improvements in MWD acoustic imaging. A downhole acoustic logging tool is used for generating a guided borehole wave that propagates into the formation as a body wave, reflects from an interface and is converted back into a guided borehole wave. Guided borehole waves resulting from reflection of the body wave are used to image a reflector. U.S. Pat. No. 8,811,114 B2 to Geerits et al., having the same assignee as the present disclosure and the contents of which are incorporated herein by reference, discloses further improvements in MWD acoustic imaging.

Having multiple sources axially distributed in the drillstring enables the performance of a multi-offset measurement (variable source-receiver and source-reflector distance) in one run. With only one source in the drillstring this could be achieved by repetitive measurements while drilling ahead only. Mapping the same reflector with changing source-reflector distances as well as having varying source-receiver offsets may be beneficial for data evaluation.

The acoustic reflection image may be a result of acoustic pre-processing (e.g., noise reduction, filtering, removal or attenuation of direct waves and multiples). One major difference of the borehole acoustic data, as compared to surface seismic data, is the large amplitude direct arrivals in the borehole data. Thus, these direct waves are often removed before processing the secondary arrivals of much smaller amplitude.

The data may be windowed to exclude converted waves and multiples. In conventional imaging techniques, following this, the secondary arrivals (reflection events) from the wave-separation procedure are then respectively migrated to image the upper and lower side of the formation reflector using one or more well-known migration techniques, e.g., the back-projection scheme using a generalized Radon transform as discussed by Hornby, or the commonly used Kirchoff depth migration method as discussed, for example by Li et al. After conventional migration, the acoustic component data may be mapped into a two-dimensional ('2D') domain.

The 3D oriented composite acoustic ultrasonic computed velocity vectors (shear and compressed) correlated and referenced to corresponding inferred reservoir structural and layered descriptions may be associated with lithology, geological reservoir structural and composition descriptions and anomalies, tectonic structures, development trends and forces in physics processes connections with geo-mechanical reservoir dynamic and static processes and analysis.

All ultrasonic methods depend in principle upon the fact that the velocity of propagation of ultrasonic wave in a solid medium is influenced by stresses present in the medium. Tools described herein may be configured to estimate mechanical properties of the rock matrix of the formation. The acoustic beam of the present disclosure reaches deeper into the formation and has more directivity, thereby evaluating deeper and less disturbed parts of the formation and producing a more reliable evaluation of rock properties as a result. The mechanical properties evaluation of the rock using the multitone acoustic beam exhibits improved penetration of the borehole wall, thereby avoiding near-surface rock damage that may result from drilling operations. In particular embodiments, the tool may include a plurality of (e.g., three) linear transducer arrays, although the array may also include concentric circular sub-arrays with semicircular or arcuate transducers configured for differential shear mode drive and sensing. Each array may operate in at least a differential (shear) mode and common (compression) mode for driving and receiving the signal.

A first array of the plurality may be an ultrasonic acoustic source driver capable of differential mode and common mode operations. A second and third array of the plurality may be ultrasonic sensors separated by a known wave travel distance (d) which is used for velocity calculations for both shear and compression waves. Shear velocity and compression velocity may be measured using time of flight over sensor spacing (L). In combination with non-acoustic data (e.g., bulk density ρ, which may be obtained from nuclear measurements), the shear velocity and compression velocity may be used to estimate elastic constants of the formation as detailed in the equations below.

$$\text{Bulk Modulus: } K = \rho(Vc)^2 - \frac{4}{3}(Vs)^2 = \rho\left(\frac{3DTS^2 - 4DTC^2}{3DTS^2DTC^2}\right) * C$$

$$\text{Young's Modulus: } E = \frac{9K\rho(Vs)^2}{3K + \rho(Vs)^2} = \left(\frac{\rho}{DTS^2}\right)\left(\frac{3DTS^2 - 4DTC^2}{DTS^2 - DTC^2}\right) * C$$

$$\text{Shear Modulus: } \mu = \rho(Vs)^2 = \frac{\rho}{DTS^2} * C$$

$$\text{Poisson's Ratio: } \sigma = \frac{1}{2}\left(\frac{\left(\frac{Vc}{Vs}\right)^2 - 2}{\left(\frac{Vc}{Vs}\right)^2 - 1}\right) = \frac{1}{2}\left(\frac{DTS^2 - 2DTC^2}{DTS^2 - DTC^2}\right)$$

where $\rho$ = Bulk Density, g/cm$^3$ $Vc$ = Compressional Velocity, ft/sec;

$DTC$ = Compressional Slowness, $\mu$sec/ft $Vs$ = Shear Velocity, ft/sec; $DTS$ = Shear Slowness, $\mu$sec/ft $C$ = Conversion Factor (1.34 * 10$^{10}$)

The elastic constants may be used for performing and/or modeling hydraulic fracturing, compaction, subsidence, in-situ stress prediction, borehole stability, depletion induced stress field changes, and so on using techniques well known to those of skill in the art. Further parameters of interest, including operational parameters, may be estimated using the above information, include a drilling fluid ('mud') weight window, parameters for controlled breakout modeling, parameters for oriented perforation, sand strength, and fracturing operations.

Figure 8:
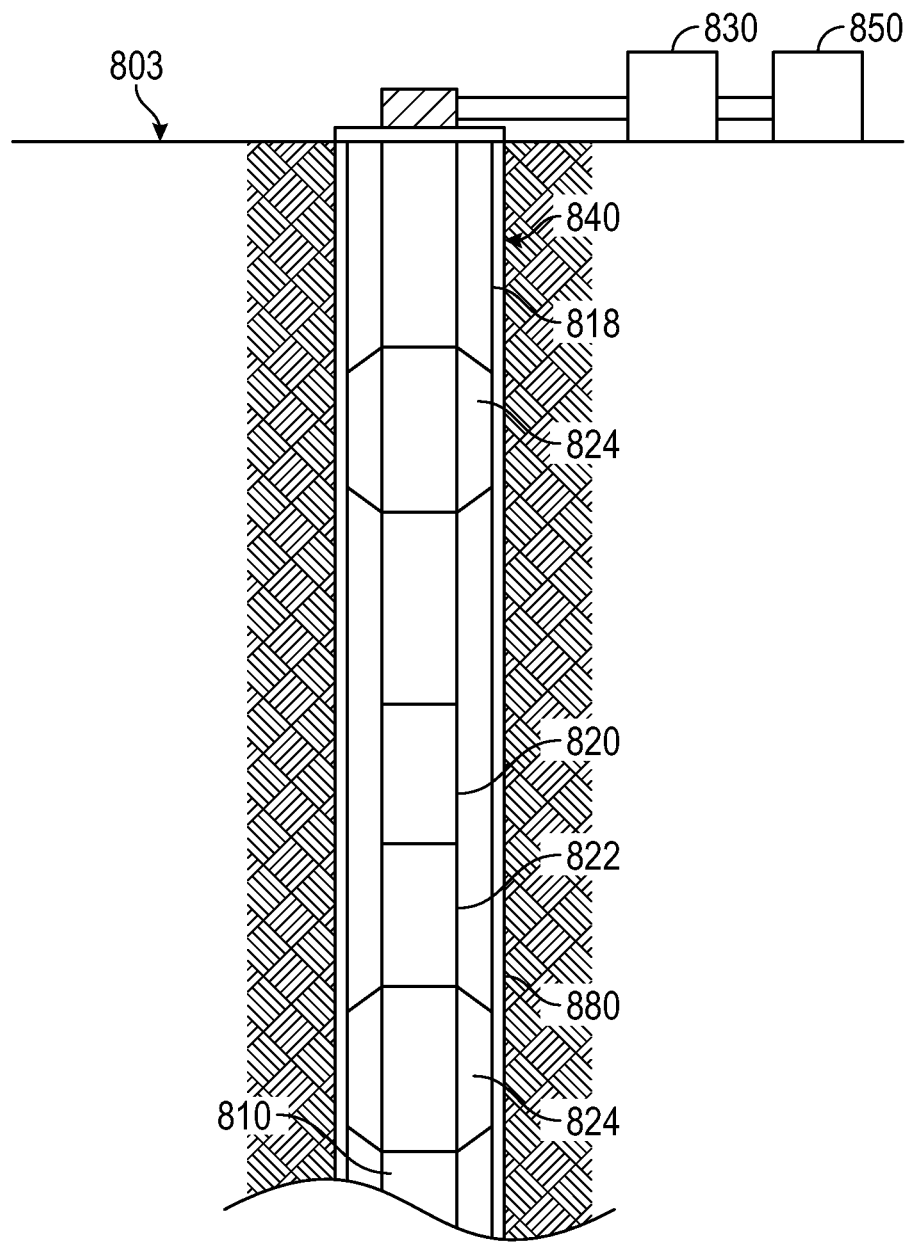
FIG. 8 illustrates a stimulation system in accordance with embodiments of the present disclosure.

FIG. 8 illustrates a stimulation system in accordance with embodiments of the present disclosure. The system 803 includes a downhole tool string 810, such as a stimulation string, wireline, or other carrier conveyed in a borehole 840 surrounded by casing 818. In one embodiment, the system 803 is configured as a hydraulic stimulation system, but may also configured for additional functions such as hydrocarbon production, evaluation of the formation, evaluation of the borehole, and so on. As described herein, "stimulation" may include any injection of a fluid into a formation. An exemplary stimulation system may be configured as a cased or open hole system for initiating fractures and/or stimulating existing fractures in the formation. A fluid may be any flowable substance.

The tool string 810 may include one or more tools or components to facilitate stimulation of the formation 880. For example, the tool string 810 may include a fracturing assembly 820 including, e.g., injection nozzles and mechanical valve devices (e.g., fracturing sleeves, drop-ball devices, and so on). The tool string 810 may include a perforation assembly 822. The tool string 810 may include additional components, such as one or more isolation components 824 (e.g., packer subs, frangible barriers, etc.). Subs may include one or more processors or associated electronics configured to communicate with a surface processing unit and/or control the respective component or assembly. The system 803 may be a hydraulic fracturing system that includes an injection device 830 (e.g., a high pressure pump) in fluid communication with a fluid source 850. The injection device 130 injects fluid into the string 810 to introduce fluid into the formation 880. Measurement and control devices, including one or more sensors responsive to pumping parameters, may be included for monitoring and control of the respective operation (e.g., hydraulic fracturing or other stimulation).

Figure 9:
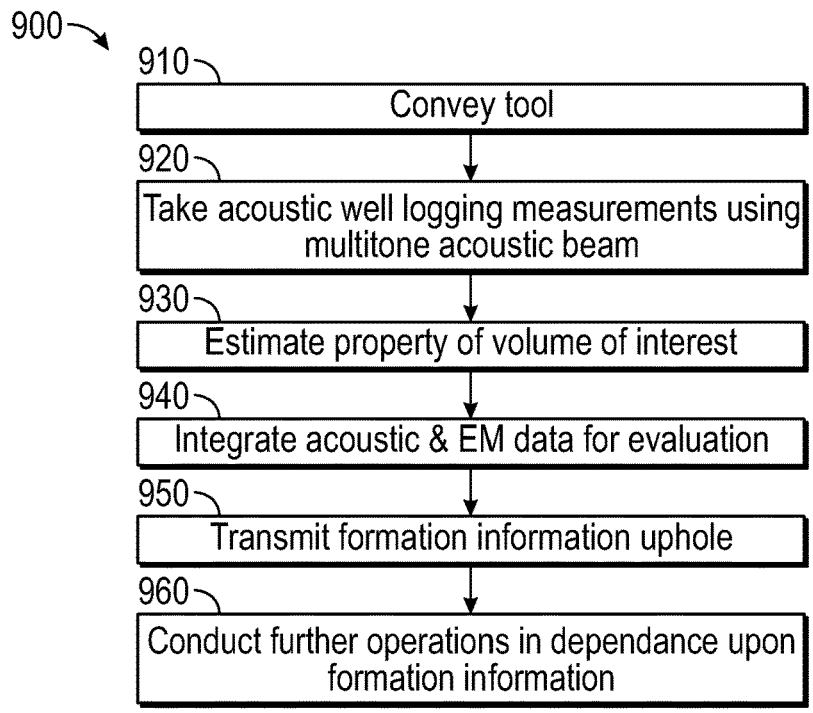
FIG. 9 shows a flow chart illustrating methods for performing well logging in a borehole intersecting an earth formation in accordance with embodiments of the present disclosure.

FIG. 9 shows a flow chart 900 illustrating methods for performing well logging in a borehole intersecting an earth formation in accordance with embodiments of the present disclosure. In optional step 910, an acoustic well logging tool is conveyed in a borehole using a carrier. The borehole may be filled with downhole fluid.

Step 920 of the method 900 may include taking acoustic well logging measurements with the logging tool. Step 920 may include generating a multitone acoustic beam from at least one transmitter on the tool. The beam comprises a high frequency signal modulated by a low frequency envelope. The high frequency signal includes a first subsignal at a first frequency and a second subsignal at a second frequency. The beam may be rotated, e.g., by rotating a stacked transducer through a plurality of azimuthal orientations. At least one of the first frequency and the second frequency may correspond to a resonant frequency of the at least one tubular. The high frequency signal may have a frequency greater than 350 kHz; the low frequency envelope may have a frequency less than 100 kHz. The multitone acoustic beam may have a lateral beam field of dimensions substantially the same as that of the high-frequency signal.

Step 920 may further include generating measurement information at at least one acoustic receiver on the logging tool in response to a plurality of acoustic reflections of the acoustic beam from at least one volume of interest in the formation. As one example, acoustic waves corresponding to the generated multitone acoustic beam travel through multiple liners in the borehole hitting every interface, portions of which are reflected back and received by the at least one acoustic receiver.

Generating measurement information may include producing a plurality of borehole caliper measurements including measurements from each of a plurality of azimuthally distributed orientations about the carrier; and wherein estimating a property of the volume of interest using the measurement information comprises estimating a property of the borehole. The property may include at least one of i) a geometry of the borehole; and ii) an image of the borehole wall.

The volume of interest may be a plurality of nested conductive tubulars in the borehole, and estimating the property may be carried out by estimating a property corresponding to at least one tubular (and possibly all) of the plurality of nested conductive tubulars. The property corresponding to each conductive tubular may include at least one of: i) location of the tubular; ii) thickness of the tubular; and iii) at least one property of a defect of the tubular; iv) a presence of a completion component outside at least one tubular; and v) a property of a completion component outside at least one tubular.

Measurements in a casing and cement evaluation context usually rely on detection of resonance frequency and signal amplitude decays to assess casing thickness and bond integrity. A multiple tubular system, such as double casings, may have more than three resonance modes—resonance from each casing, resonances from the composite system, and harmonic resonances. For example, a well-bonded, well-coupled double-casing system typically exhibits a lower resonance frequency than each casing layer resonance individually. To maximize energy penetration and signal sensitivity, exciting casing resonance may be required.

Thus, in some implementations, taking acoustic well logging measurements may include estimation of resonance frequencies of the acoustic system and its components, as described in further detail below with respect to FIG. 10.

Step 930 comprises estimating a property of the volume of interest using the measurement information. This may be carried out as described above with respect to specific applications. As one example, inner diameter ('ID') and outer diameter ('OD') dimensions and position may be estimated for multiple casing liners, along with borehole diameter, casing and borehole eccentricity, casing and borehole 3D geometrical shape. From time delay and attenuation estimates, the OD and ID, borehole diameter, and casing and borehole eccentricity may be estimated; and cement bond evaluation may be performed. Position and geometry estimates for well service and control lines and cables may be similarly estimated. From frequency domain analysis, casing resonance frequency, cement layer resonance frequency, and harmonic generations may be identified. These properties may be used to estimate casing thickness, cement layer thickness, casing damage detection, and cement bond evaluation, in accordance with conventional techniques.

Optional step 940 comprises integration of acoustic and EM data. Step 940 may include generating an electromagnetic (EM) field using an EM transmitter of the logging tool to produce interactions between the electromagnetic field and the plurality of nested conductive tubulars; obtaining EM measurements indicative of the interactions; and performing an inversion of the EM and acoustic measurements using concurrently or iteratively and sequentially an EM and acoustic forward model generated with the property corresponding to each conductive tubular's material properties, eccentricity relative to each other, ovality, materials between tubulars, and between tubulars and the formation. The interactions may include at least one of: i) magnetic flux leakage; and ii) induced eddy currents. Generating the EM field may be carried out by exciting an EM field using a first radially oriented EM transmitter at a first polarity and a second radially oriented EM transmitter at a second polarity opposite of the first polarity. The inversion results and data interpretation could be used with corresponding forward models to establish tubular anomalies with respect to a previous measurement survey or tubular baseline reference for a tubular under normal and nominal conditions (Consider ADDing a claim for this).

The EM measurements may include instrument casing installation survey data and multifrequency induction logging data. Reference information such as cement resistivity, casing material properties and dimensions, formation resistivity data, and fluid characteristics may also be applied. Acoustic data may also be used to determine azimuthal orientation.

A forward model response may be established for the applicable electromagnetic casing survey tool used to acquire the measurements based on an ideal structure previously defined from a prior infrastructure knowledge. Another forward model may be established based on estimated structure and position from the acoustic measurements in step 930. An inversion may be performed with EM field casing survey tool's forward model response to establish borehole and multiple casings geometry, thickness and corrosion variations, and disturbances based on an estimated multiple casing structure.

Optional step 950 comprises transmitting formation information uphole. Optional step 960 comprises conducting further operations in the formation in dependence upon the formation information.

Figure 10:
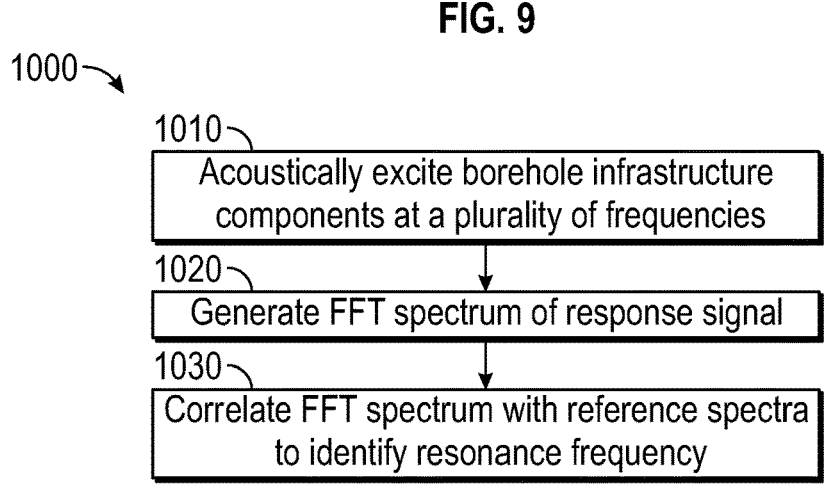
FIG. 10 illustrates a method for detecting casing resonances via acoustic excitation.

FIG. 10 illustrates a method for detecting casing resonances via acoustic excitation using a frequency sweep or short-duration broad-band pulse from a broad-band transducer, e.g., a transducer attached to a casing wall. In step 1010, a transmitter is used to acoustically excite the volume of interest, and the borehole infrastructure components therein, at a plurality of frequencies. The components may include, for example, a plurality of nested conductive tubulars in the borehole. At step 1020, a Fast Fourier Transform (FFT) spectrum of a returned signal at a receiver responsive to the excitation is generated. At step 1030, the FFT spectrum is compared (e.g., correlated) with reference spectra determined from a range of known casing thicknesses and intermediate layers to identify a resonance frequency corresponding to each of one or more of the components. The resonance frequencies of each casing layer, including, most importantly, that of the outer casing layer, may be identified from modeled or measured reference spectra at known conditions. The results of FFT correlation between the FFT measured and template spectra, and those results of other FFT attributes (amplitude, phase, and group delay around resonance frequency) may be used to identify casing resonance of each casing layer, estimate casing wall thickness, and assess bond conditions behind each casing.

Here the reference FFT spectrum may be determined from theoretical models or measured in a laboratory setting with known casing thicknesses and coupling materials behind each casing (i.e., well bonded inner and outer casings, well bonded inner casing and poorly bonded outer casings, liquid or gas behind the casing, and so on. Casing thickness is sensitive to its resonance frequency and thus may be estimated based on known correlations, as described above. Cement bond and material behind casing are sensitive to FFT amplitude at the resonance, as well as phase and group delay around the resonance. Thus, for example, a drift in resonance frequency may be used to detect a wall thickness change. Variations in the amplitude of casing resonance and in the phase and group delay (i.e., the depth and the width of a group delay spectrum) around resonance frequency may be used to estimate bond-line or material coupling conditions behind the casing. For example, a higher degree of resonance damping (at resonance) is indicative of a well-bonded well-coupled double-casing system compared to a poorly-bonded double-casing composite system.

The above method using frequency sweep or short-pulse broad-band beam can help detect the resonance frequency for each casing layer. Use of the multi-tone acoustic beam described above, with narrow band bursts at the resonance frequency of the casing layer, may be used to maximize signal transmission into the casing layer. The correlation of the measured and template FFT spectra is advantageous over time-domain correlation, as it preserves the resonances of individual casings. The phase and group delay responses are also more sensitive to load material behind (and coupling behind) the casing.

Figure 11:
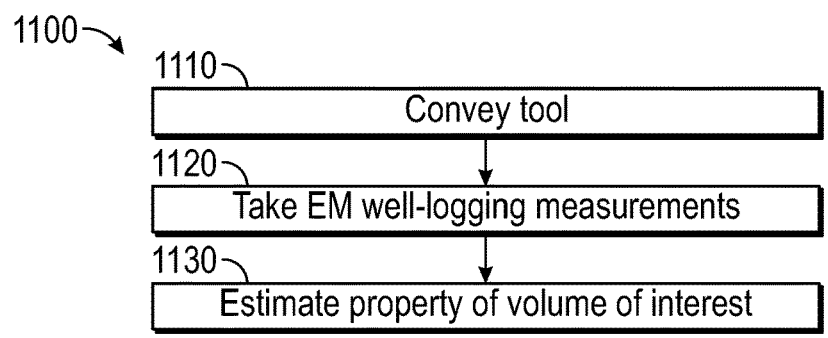
FIG. 11 shows a flow chart illustrating methods for performing well logging in a borehole intersecting an earth formation in accordance with embodiments of the present disclosure.

FIG. 11 shows a flow chart 1100 illustrating methods for performing well logging in a borehole intersecting an earth formation in accordance with embodiments of the present disclosure. In optional step 1110, an EM well logging tool is conveyed in a borehole using a carrier. The borehole may be filled with downhole fluid. Step 1120 of the method 1100 may include taking EM well logging measurements with the logging tool. Step 1120 may be carried out by generating an electromagnetic (EM) field using an EM transmitter of the logging tool to produce interactions between the electromagnetic field and a plurality of nested conductive tubulars in the borehole; and obtaining EM measurements indicative of the interactions. Generating the electromagnetic (EM) field may include exciting the EM field using a first radially oriented EM transmitter at a first polarity and a second radially oriented EM transmitter at a second polarity opposite of the first polarity. Step 1130 comprises estimating a property corresponding to a volume of interest comprising at least one tubular of the plurality of nested conductive tubulars by performing an inversion of the EM measurements.

Those versed in the art would recognize that the measurements made by the flux sensor would be affected by both the casing thickness and possible lateral inhomogeneities in the casing. In the context of borehole applications, the segments of casing string may be assumed to be magnetically homogenous at the manufacturing and installation stage, so that the absolute flux changes would be diagnostic of changes in casing thickness or casing perforations. Casing thickness variations could occur internally or externally to the casing. If, on the other hand, flux changes are observed in a section of casing known to be of uniform thickness, this would be an indication of changes in permeability of the casing caused possibly by heat or mechanical shock.

With measurements of two or more components of magnetic flux, it is possible to compensate for permeability changes and estimate the casing thickness. Such a method based on wavelet basis functions and which uses axial and radial flux measurements to determine the thickness of a pipeline has been discussed in S. Mandayam et al. Wavelet-based permeability compensation technique for characterizing magnetic flux leakage images, NDT&E International, vol. 30, No. 5, pp. 297-303, 1997, 7 Figs. We summarize the method of Mandayam.

Given two signals $X_A$ and $X_B$ characterizing the same phenomenon, one can choose two distinct features $x_A(d, l, t)$ and $x_B(d, l, t)$ where t is an operational variable such as permeability, and d and l represent defect related parameters such as depth and length, $x_A(d, l, t)$ and $x_B(d, l, t)$ must be chosen so that they have dissimilar variations with t. In order to obtain a feature h that is a function of $x_A$ and $x_B$ and invariant with respect to the parameter t, one needs to obtain a function $f$ such that $$f\{x_A(d,l,t), x_B(d,l,t)\} = h(d,l) \qquad (1).$$

Given two functions $g_1$ and $g_2$, sufficient condition to obtain a signal invariant with respect to t, can be derived as $$h(d,l) \circ g_1(x_A) = g_2(x_B) \qquad (2),$$

where ∘ refers to a homomorphic operator. Then the desired t-invariant response is defined as $$f(x_A, x_B) = g_2(x_B) \circ g_1^{-1}(x_A) \qquad (3).$$

The above procedure is implemented by proper choice of the functions h, $g_1$ and $g_2$.

In an example given by Mandayam, the radial and axial flux measurements are made. The defect related features are $P_z$, the peak-peak amplitude of the axial flux density and $P_r$, the peak to peak amplitude of the radial flux density, both of which are measures of the defect depth d; $D_r$, the peak-peak separation of the radial flux density (which is related to the defect's axial length l); $D_c$, the circumferential extent of the asial flux density (which determines the defect width w). The permeability invariant feature is derived as:

$$h(d, l, w) = \frac{P_z(d, l, w, t)}{g_1\{P_r(d, l, w, t), P_z(d, l, w, t), D_r, D_c\}} \quad (4)$$

where t represents the permeability and $g_1$ is a geometric transformation function that maps the permeability variation of $P_1$ on to that of $P_z$. To get to eqn. (4), the function $g_2$ of eqn. (3) is assumed to be the identity function. Madayam assumes a suitable functional form for $g_1$ and determines its parameters using a neural net. The basic approach of Mandayam may be extended to three component measurements that are available with the apparatus of the present invention. As the sensor passes over an internal defect, the decrease in flux caused by the "missing" metal of the ID defect is detected, and serves to reveal the presence of an internal anomaly.

Optional methods may include using the parameter of interest to estimate a characteristic of a formation. Estimation of the parameter may include the use of a model. In some embodiments, the model may include, but is not limited to, one or more of: (i) a mathematical equation, (ii) an algorithm, (iii) an deconvolution technique, and so on. Reference information accessible to the processor may also be used.

Method embodiments may include conducting further operations in the earth formation in dependence upon formation information, estimated properties of the reflector(s), or upon models created using ones of these. Further operations may include at least one of: i) geosteering; ii) drilling additional boreholes in the formation; iii) performing additional measurements on the formation; iv) estimating additional parameters of the formation; v) installing equipment in the borehole; vi) evaluating the formation; vii) optimizing present or future development in the formation or in a similar formation; viii) optimizing present or future exploration in the formation or in a similar formation; ix) drilling the borehole; and x) producing one or more hydrocarbons from the formation.

Estimated parameters of interest may be stored (recorded) as information or visually depicted on a display. The parameters of interest may be transmitted before or after storage or display. For example, information may be transmitted to other downhole components or to the surface for storage, display, or further processing. Aspects of the present disclosure relate to modeling a volume of an earth formation using the estimated parameter of interest, such as, for example, by associating estimated parameter values with portions of the volume of interest to which they correspond, or by representing the boundary and the formation in a global coordinate system. The model of the earth formation generated and maintained in aspects of the disclosure may be implemented as a representation of the earth formation stored as information. The information (e.g., data) may also be transmitted, stored on a non-transitory machine-readable medium, and/or rendered (e.g., visually depicted) on a display.

The processing of the measurements by a processor may occur at the tool, the surface, or at a remote location. The data acquisition may be controlled at least in part by the electronics. Implicit in the control and processing of the data is the use of a computer program on a suitable non-transitory machine readable medium that enables the processors to perform the control and processing. The non-transitory machine readable medium may include ROMs, EPROMs, EEPROMs, flash memories and optical disks. The term processor is intended to include devices such as a field programmable gate array (FPGA).

Acoustic logs are records of the receipt, at successive borehole depth levels, of acoustic signals by receivers which are spaced along the length of a borehole tool from each other and from at least one transmitter of acoustic signals.

The term "conveyance device" as used above means any device, device component, combination of devices, media and/or member that may be used to convey, house, support or otherwise facilitate the use of another device, device component, combination of devices, media and/or member. Exemplary non-limiting conveyance devices include drill strings of the coiled tube type, of the jointed pipe type and any combination or portion thereof. Other conveyance device examples include casing pipes, wirelines, wire line sondes, slickline sondes, drop shots, downhole subs, BHA's, drill string inserts, modules, internal housings and substrate portions thereof, self-propelled tractors. As used above, the term "sub" refers to any structure that is configured to partially enclose, completely enclose, house, or support a device. The term "information" as used above includes any form of information (Analog, digital, EM, printed, etc.). The term "processor" or "information processing device" herein includes, but is not limited to, any device that transmits, receives, manipulates, converts, calculates, modulates, transposes, carries, stores or otherwise utilizes information. An information processing device may include a microprocessor, resident memory, and peripherals for executing programmed instructions. The processor may execute instructions stored in computer memory accessible to the processor, or may employ logic implemented as field-programmable gate arrays ('FPGAs'), application-specific integrated circuits ('ASICs'), other combinatorial or sequential logic hardware, and so on. Thus, a processor may be configured to perform one or more methods as described herein, and configuration of the processor may include operative connection with resident memory and peripherals for executing programmed instructions.

The term "beam," as used herein, is defined as an acoustic emission of limited aperture. Limited aperture refers to an azimuthal span of acoustic phenomena in connection with the emission of less than 30 degrees. The term "practical envelope frequency" refers to the effective frequency for pressure wave detection. According to the law of superposition, two tones sounding simultaneously may be mathematically superimposed. For example, the signal may be represented as $2 \sin(f_3 t)\cos(f_3 t)$, where $f_3$ is the average of $f_1$ and $f_2$ and $f_4$ is half of the difference of $f_1$ and $f_2$. As a result, a function representing two or more pure tones does not remain constant, but instead changes over time. When the waves of the two tones are 180 degrees out of phase, the maxima of one wave cancels the minima of the other; when perfectly in phase, the maxima may be summed resulting in increased amplitude. The envelope of the maxima and minima form a wave whose frequency is half the difference between the frequencies of the two original waves. If the two tones are significantly close in frequency, the frequency of $f_4$ is too low to be sensed, and instead results as a periodic variation in the amplitude of the sin term. Thus, the lower frequency cos term acts as an envelope for the higher frequency sin term, i.e., modulating its amplitude. Technically, the frequency of the modulation is the average of the two frequencies. Because every second burst in the modulation pattern is inverted, however, amplitude or intensity based detection is registered at twice the frequency of the modulating cosine. Thus, the practical envelope frequency is the difference between the first frequency and the second frequency. "Resonant frequency" refers to a frequency having a frequency response maximum. The term "significantly close in frequency" as used herein refers to frequencies having a difference of less than 15 Hz.

As used herein, the term "fluid" and "fluids" refers to one or more gasses, one or more liquids, and mixtures thereof. A "downhole fluid" as used herein includes any gas, liquid, flowable solid and other materials having a fluid property and relating to hydrocarbon recovery. A downhole fluid may be natural or man-made and may be transported downhole or may be recovered from a downhole location. Non-limiting examples of downhole fluids include drilling fluids, return fluids, formation fluids, production fluids containing one or more hydrocarbons, engineered fluids, oils and solvents used in conjunction with downhole tools, water, brine, and combinations thereof. An "engineered fluid" may be used herein to mean a human made fluid formulated for a particular purpose. The term "geosteering" may refer to changing direction of the drill bit, stopping progression of the drill bit, or continuing advancement of the drill bit.

The term "information" as used herein includes any form of information (analog, digital, EM, printed, etc.). As used herein, a processor is any information processing device that transmits, receives, manipulates, converts, calculates, modulates, transposes, carries, stores, or otherwise utilizes information. In several non-limiting aspects of the disclosure, a processor includes a computer that executes programmed instructions for performing various methods. These instructions may provide for equipment operation, control, data collection and analysis and other functions in addition to the functions described in this disclosure. The processor may execute instructions stored in computer memory accessible to the processor, or may employ logic implemented as field-programmable gate arrays ('FPGAs'), application-specific integrated circuits ('ASICs'), other combinatorial or sequential logic hardware, and so on.

Thus, configuration of the processor may include operative connection with resident memory and peripherals for executing programmed instructions. In some embodiments, estimation of the parameter of interest may involve applying a model. The model may include, but is not limited to, (i) a mathematical equation, (ii) an algorithm, (iii) a database of associated parameters, or a combination thereof.

Measurements of sonic travel time, or "slowness," are well known, and may be considered as depending upon the properties inherent in Snell's Law to propagate sound from a transmitter to a receiver through an earth formation. Slowness is the inverse of the sound velocity. The measurement is representative of travel time of sound through the formation. Typically the term refers to measurements wherein the transmitter and receiver are in a borehole intersecting the formation, e.g., on a tool string in the borehole. The speed of sound in the earth formation is governed in approximation by the physical properties embodied in the Wood-Biot-Gassmann equations. It is apparent that the values of slowness and velocity may be used interchangeably in the techniques disclosed herein. The parameters slowness and velocity are inversely related and the measurement of either may be converted to the other by simple mathematical relations that are well known in the art. Thus, the term "slowness" as used herein may refer to slowness as traditionally understood, as well as other parametric equivalents.

"Closure pressure" as used herein refers to a parameter used in hydraulic fracture design to indicate the pressure at which the fracture effectively closes without proppant in place. "Profile" as used herein refers to a model. Parameters of interest may include lateral tectonic strain, minimum horizontal stress, and so on. "Substantially different" as used herein means not substantially the same. "Substantially the same," or "substantially similar" as used herein means a value consistent with a general formation structure, feature, or operating parameter, or having a value within a common statistical deviation, such as within one standard deviation, within 5 percent, within 1 percent of a moving average and so on. Substantially the same refers to values within the generally held value for common deviation, such as, for example, due to noise. The term "substantially the same" as applied in the context of signal characteristic refers to frequencies negating the effects of dispersion and attenuation, such that differences in effects between two signals having corresponding signal characteristics are negligible, such as, for example, differences in lateral beam field of less than 25 percent, less than 10 percent, less than 5 percent, less than 3 percent, less than 2 percent, less than 1 percent, less than 0.5 percent, and so on, down to and including no difference.

The estimated parameter of interest may be stored (recorded) as information or visually depicted on a display. Aspects of the present disclosure relate to modeling a volume of an earth formation using the estimated parameter of interest, such as, for example, by associating estimated parameter values with portions of the volume of interest to which they correspond. The model of the earth formation generated and maintained in aspects of the disclosure may be implemented as a representation of the earth formation stored as information. The information (e.g., data) may be stored on a non-transitory machine-readable medium, and rendered (e.g., visually depicted) on a display.

Control of components of apparatus and systems described herein may be carried out using one or more models as described above. For example, at least one processor may be configured to modify operations i) autonomously upon triggering conditions, ii) in response to operator commands, or iii) combinations of these. Such modifications may include changing drilling parameters, steering the drillbit (e.g., geosteering), changing a mud program, optimizing measurements, and so on. Control of these devices, and of the various processes of the drilling system generally, may be carried out in a completely automated fashion or through interaction with personnel via notifications, graphical representations, user interfaces and the like. Reference information accessible to the processor may also be used.

The processing of the measurements made in wireline or MWD applications may be done by a surface processor, by a downhole processor, or at a remote location. The data acquisition may be controlled at least in part by the downhole electronics. Implicit in the control and processing of the data is the use of a computer program on a suitable non-transitory machine readable medium that enables the processors to perform the control and processing. The non-transitory machine readable medium may include ROMs, EPROMs, EEPROMs, flash memories and optical disks.

The term processor is intended to include devices such as a field programmable gate array (FPGA).

The term "substantially real-time" as applied to methods of the present disclosure refers to an action performed (e.g., estimation, modeling, and so on) while the sensor is still downhole, after the generation of the information and prior to movement of the sensor an appreciable distance within the context of evaluating the borehole or formation at an associated resolution, such as, for example, a distance of 100 meters, 50 meters, 25 meters, 10 meters, or less; and may be defined as estimation of the parameter of interest or production of the current iteration of a model within 15 minutes of generating the information, within 10 minutes of generation, within 5 minutes of generation, within 3 minutes of generation, within 2 minutes of generation, within 1 minute of generation, or less. The term "substantially continuous" as applied to measurement in accordance with embodiments of the present disclosure means that no gaps exist within the measurement corresponding to a circumference of the borehole at a particular borehole depth.

While the foregoing disclosure is directed to the one mode embodiments of the disclosure, various modifications will be apparent to those skilled in the art. It is intended that all variations be embraced by the foregoing disclosure.

What is claimed is:

1. A method of well logging using a logging tool in a borehole in an earth formation, the method comprising:
   conveying the logging tool in the borehole on a carrier;
   taking acoustic well logging measurements with the logging tool including:
      generating a multitone acoustic beam from at least one transmitter on the tool, the beam comprising a high frequency signal modulated by a low frequency envelope, the high frequency signal including a first subsignal at a first frequency and a second subsignal at a second frequency;
      generating measurement information at at least one acoustic receiver on the logging tool in response to a plurality of acoustic reflections of the acoustic beam from at least one volume of interest in the formation; and
   estimating a property of the volume of interest using the measurement information.

2. The method of claim 1 wherein the volume of interest comprises a plurality of nested conductive tubulars in the borehole, and estimating the property comprises estimating a property corresponding to at least one tubular of the plurality of nested conductive tubulars.

3. The method of claim 2 wherein estimating the property comprises estimating a property corresponding to each conductive tubular of the plurality of nested conductive tubulars.

4. The method of claim 3 wherein the property corresponding to each conductive tubular comprises at least one property selected from the group consisting of: i) location of the tubular; ii) thickness of the tubular; iii) at least one property of a defect of the tubular; iv) a presence of a completion component outside at least one tubular; or v) a property of a completion component outside at least one tubular.

5. The method of claim 3 further comprising:
   generating an electromagnetic (EM) field using an EM transmitter of the logging tool to produce interactions between the electromagnetic field and the plurality of nested conductive tubulars;
   obtaining EM measurements indicative of the interactions; and
   performing an inversion of the EM measurements using a forward model generated with the property corresponding to each conductive tubular.

6. The method of claim 5 wherein the interactions comprise interactions selected from the group consisting of: i) magnetic flux leakage; or ii) induced eddy currents.

7. The method of claim 5 wherein the EM transmitter comprises a first radially oriented EM transmitter, and wherein generating the electromagnetic (EM) field comprises exciting an EM field using the first radially oriented EM transmitter at a first polarity and a second radially oriented EM transmitter at a second polarity opposite of the first polarity.

8. The method of claim 5 comprising:
   performing a joint inversion using the EM measurements and the measurement information at the at least one acoustic receiver to resolve a structural feature relating to at least one tubular of the plurality of nested conductive tubular, the structural feature comprising at least one structural feature selected from the group consisting of: i) tubular ovality of the at least one tubular; ii) deformation of the at least one tubular; iii) corrosion of the at least one tubular, iv) perforation of the at least one tubular, v) a presence of a completion component outside of the at least one tubular, vi) eccentricity of the at least one tubular with respect to another component, vii) a material property of the at least one tubular; or viii) a material property of a material surrounding the at least one tubular.

9. The method of claim 2 wherein at least one of the first frequency and the second frequency correspond to a resonant frequency of the at least one tubular.

10. The method of claim 1 comprising generating the multitone acoustic beam using a rotating stacked transducer.

11. The method of claim 1 wherein the beam is generated by supplying a multitone modulated signal to a transducer, the multitone modulated signal derived by applying an envelope modulating frequency signal to a center frequency signal.

12. The method of claim 1 wherein the beam is generated by generating low-frequency acoustic beat signals from interference of at least two high-frequency acoustic beams.

13. The method of claim 1 wherein the carrier comprises a carrier selected from the group consisting of i) a drill string; or ii) a wireline.

14. The method of claim 13 wherein the carrier comprises a drill string, the logging tool comprises a bottom hole assembly (BHA), and the at least one transmitter comprises a transmitter disposed on the drill bit, the method further comprising performing drilling operations by rotating a drill bit disposed at a distal end of the drill string and taking acoustic well logging measurements during drilling operations.

15. The method of claim 13 wherein the further operations comprise at least one operation selected from the group consisting of: i) geosteering; ii) drilling additional boreholes in the formation; iii) performing additional measurements on the formation; iv) estimating additional parameters of the formation; v) installing equipment in the borehole; vi) evaluating the formation; vii) optimizing present or future development in the formation or in a similar formation; viii) optimizing present or future exploration in the formation or in a similar formation; ix) drilling the borehole; or x) producing one or more hydrocarbons from the formation.

16. The method of claim 1 wherein the volume of interest comprises a volume of a rock matrix of the formation, and estimating the property comprises estimating at least one property selected from the group consisting of: i) a bulk modulus of the rock matrix; ii) a shear modulus of the rock matrix; iii) a Young's modulus of the rock matrix; iv) a Poisson ratio of the rock matrix; v) a porosity of the rock matrix; vi) a compressional velocity of the formation; or vii) a shear velocity of the formation.

17. The method of claim 1 comprising conducting further operations in the formation in dependence upon the property.

18. The method of claim 1 wherein the multitone acoustic beam has a lateral beam field of dimensions substantially the same as that of the high-frequency signal.

19. The method of claim 1 wherein generating measurement information comprises producing a plurality of borehole caliper measurements including measurements from each of a plurality of azimuthally distributed orientations about the carrier; and wherein estimating a property of the volume of interest using the measurement information comprises estimating a property of the borehole.

20. The method of claim 1 wherein the property comprises at least one property selected from the group consisting of i) a geometry of the borehole; or ii) an image of the borehole wall.

21. A method of well logging using a logging tool in a borehole in an earth formation, the method comprising:
conveying the logging tool in the borehole on a carrier;
taking electromagnetic (EM) well logging measurements with the logging tool including:
generating an electromagnetic (EM) field using an EM transmitter of the logging tool to produce interactions between the electromagnetic field and a plurality of nested conductive tubulars in the borehole;
obtaining EM measurements indicative of the interactions; and
estimating a property corresponding to a volume of interest comprising at least one tubular of the plurality of nested conductive tubulars by performing an inversion of the EM measurements;
wherein generating the electromagnetic (EM) field comprises exciting the EM field using a first radially oriented EM transmitter at a first polarity and a second radially oriented EM transmitter at a second polarity opposite of the first polarity.

22. The method of claim 21 wherein the interactions comprise interactions selected from the group consisting of: i) magnetic flux leakage; or ii) induced eddy currents.

* * * * *